(12) United States Patent
Nagata et al.

(10) Patent No.: US 8,037,755 B2
(45) Date of Patent: Oct. 18, 2011

(54) PHYSICAL QUANTITY SENSOR

(75) Inventors: Yoichi Nagata, Saitama (JP); Tohru Yanagisawa, Tokyo (JP)

(73) Assignee: Citizen Holdings Co., Ltd., Nishitokyo-shi, Tokyo (JP)

( * ) Notice: Subject to any disclaimer, the term of this patent is extended or adjusted under 35 U.S.C. 154(b) by 386 days.

(21) Appl. No.: 12/442,437

(22) PCT Filed: Sep. 21, 2007

(86) PCT No.: PCT/JP2007/068430
§ 371 (c)(1),
(2), (4) Date: Mar. 23, 2009

(87) PCT Pub. No.: WO2008/038595
PCT Pub. Date: Apr. 3, 2008

(65) Prior Publication Data
US 2010/0039094 A1 Feb. 18, 2010

(30) Foreign Application Priority Data
Sep. 27, 2006 (JP) .................................. 2006-262761

(51) Int. Cl.
*G01P 9/00* (2006.01)
(52) U.S. Cl. .................................. 73/504.04; 73/504.12
(58) Field of Classification Search ........................ None
See application file for complete search history.

(56) References Cited

U.S. PATENT DOCUMENTS

| | | | |
|---|---|---|---|
| 5,998,911 A | 12/1999 | Kikuchi et al. | |
| 2004/0154395 A1* | 8/2004 | Kikuchi et al. | 73/503.3 |
| 2005/0204813 A1* | 9/2005 | Yokoi et al. | 73/504.12 |
| 2005/0204814 A1* | 9/2005 | Yokoi et al. | 73/504.12 |
| 2006/0016259 A1* | 1/2006 | Smith | 73/504.02 |
| 2006/0123908 A1 | 6/2006 | Ito | |
| 2007/0240508 A1* | 10/2007 | Watson | 73/504.12 |
| 2010/0207754 A1* | 8/2010 | Shostak et al. | 340/450 |

FOREIGN PATENT DOCUMENTS

| | | |
|---|---|---|
| JP | 8-29179 A | 2/1996 |
| JP | 10-153432 A | 6/1998 |
| JP | 2004-53396 A | 2/2004 |
| JP | 2006-170620 A | 6/2006 |
| JP | 2006-170914 A | 6/2006 |

OTHER PUBLICATIONS

International Search Report of PCT/JP2007/068430, date of mailing Nov. 13, 2007.

* cited by examiner

*Primary Examiner* — Andre Allen
(74) *Attorney, Agent, or Firm* — Westerman, Hattori, Daniels & Adrian, LLP

(57) ABSTRACT

A physical quantity sensor 1 comprises a driving circuit 4 that drives a sensor element based on a reference signal; the sensor element 3 that is driven by the driving circuit 4 to convert an externally applied physical quantity to an electrical signal; and an amplifier circuit 5 that amplifies an output signal of the sensor element 3. The driving circuit 4 controls a driving signal, which drives the sensor element, based on the reference signal so that the driving signal is at a fixed level, and the amplifier circuit 5 has a gain characteristic that amplifies the output signal in a direction reverse to a direction in which the reference signal varies or the driving signal of the driving circuit varies. This configuration allows the physical quantity sensor to reduce output level variations in the sensor output against signal level variations in the reference signal and to make the sensitivity constant.

11 Claims, 18 Drawing Sheets

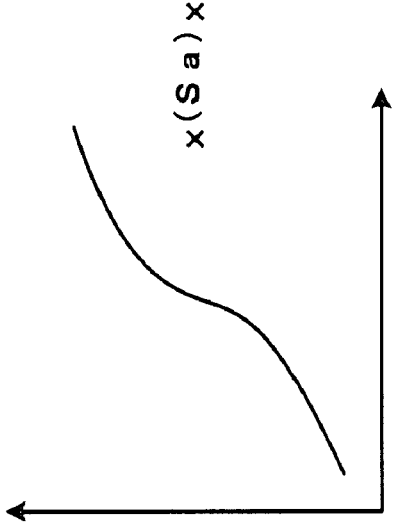
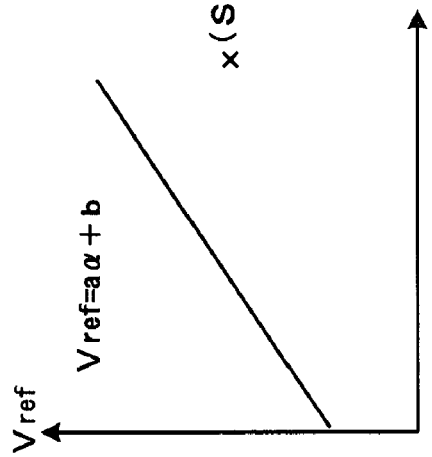

PHYSICAL QUANTITY SENSOR

FIELD OF THE INVENTION

The present invention relates to a physical quantity sensor, and more particularly to the configuration of the output circuit of a physical quantity sensor.

DESCRIPTION OF THE RELATED ART

Today, various types of physical quantity sensors are used. Especially, many proposals are made for the correction of the sensor output of an angular rate sensor typified by a vibratory gyroscope.

The prior-art technology disclosed in Patent Document 1 proposes a method for changing the detection sensitivity of a physical quantity sensor in proportion to a change in the power supply voltage at which the physical quantity sensor operates. This method is known as ratiometric. FIG. 17 is a diagram showing the general configuration of a ratiometric structure. In this ratiometric structure, a sensor 110 and an A/D converter 120 receive the supply of the common power supply voltage Vdd.

If only the sensor 110 changes its output corresponding to variations in the power supply voltage Vdd but the A/D converter 120 does not correspond to variations in the power supply voltage Vdd, there is a difference in the A/D-converted digital values. Conversely, if only the A/D converter 120 changes its output corresponding to variations in the power supply voltage Vdd but the output of the sensor 110 does not depend on variations in the power supply voltage Vdd, there is also a difference in the A/D-converted digital values.

On the other hand, if both the sensor 110 and the A/D converter 120 correspond to variations in the power supply voltage Vdd, there is no difference in the A/D-converted digital values.

Patent Document 1 discloses an example of an angular rate sensor that allows the detection sensitivity of a physical quantity sensor to be adjusted when the power supply voltage varies. In particular, the sensor in this example causes the detection sensitivity of a physical quantity sensor to change in proportion to a change in the power supply voltage, ensuring the ratiometric characteristic of the sensor sensitivity when the base voltage of A/D conversion is decreased and thereby avoiding the reading of an incorrect output level.

FIG. 18 is a diagram showing one example of the configuration of a physical quantity sensor. Referring to FIG. 18, a physical quantity sensor 101 comprises a sensor element 103 that outputs the output signal according to an external force, a driving circuit 104 that generates a driving signal that drives the sensor element 103, an amplifier circuit 107 that amplifies the output signal of the sensor element 103, and an adjustment circuit 105 that adjusts the output signal based on the power supply voltage Vdd to provide the ratiometric characteristic. Patent Document 1: Japanese Patent Laid-Open Publication No. 2004-53396 (pp. 4-6, FIG. 1)

SUMMARY OF THE INVENTION

In the physical quantity sensor 101 described above, the driving circuit 104 is driven by a voltage source 102. To stabilize the signal level of the driving signal output by this driving circuit 104, a reference signal generation circuit 109, independent of this voltage source 102, is provided and the driving circuit 104 forms the driving signal based on the reference voltage generated by this reference signal generation circuit 109.

This physical quantity sensor 101 usually performs the operation assuming that the output of the reference signal generation circuit 109 does not vary. This reference signal generation circuit 109 uses, for example, a band gap type base voltage source (see Patent Document 1) as the base voltage source to generate the signal. However, the inventor of the present invention has confirmed that the signal level of the reference signal generated by this base voltage source is not always constant but is varied by various factors such as the temperature, power supply voltage, and aging.

When the signal level of the reference signal generation circuit 109 varies, the output level of the sensor output also varies with the result that the sensitivity is not constant but is varied.

To increase the detection accuracy of the physical quantity sensor, there is a need for a physical quantity sensor that does not vary the output level of the sensor output but gives a constant sensitivity even when the signal level of the reference signal generation circuit 109 varies.

Therefore, it is an object of the present invention to solve the conventional problem and to provide a physical quantity sensor that decreases the output level variations in the sensor output when the signal level of the reference signal varies for keeping the sensitivity constant.

A physical quantity sensor according to the present invention, which amplifies the signal of the sensor output of the physical quantity sensor, adjusts the gain to reduce variations in the output level when the reference signal varies. In adjusting the gain, the direction of the gain characteristic of sensor output signal amplification is made reverse to the direction of the variation characteristic of the sensor output when the reference signal varies. Adjusting the gain in this way cancels the variations in the sensor output caused by variations in the reference signal.

The physical quantity sensor of the present invention comprises a driving circuit that drives a sensor element based on a reference signal; the sensor element that is driven by the driving circuit to convert an externally applied physical quantity to an electrical signal; and an amplifier circuit that amplifies the output signal of the sensor element. The driving circuit controls the driving signal, which drives the sensor element, based on the reference signal so that the driving signal is at a fixed level. The amplifier circuit of the present invention has a gain characteristic that amplifies an output signal in a direction reverse to a direction in which the reference signal varies or the driving signal of the driving circuit varies.

It is an object of the present invention to reduce variations in the output level of a sensor output when the signal level of the reference signal varies. Because the driving circuit forms the driving signal based on the reference signal, the driving signal of the driving circuit varies according to the reference signal. To address this problem, the present invention provides the amplifier circuit with a gain characteristic which amplifies the output signal of the amplifier circuit in a direction reverse to the direction in which the reference signal varies. This configuration reduces the output level variations in the sensor output generated when the signal level of the reference signal varies.

It is also possible for the amplifier circuit of the present invention to have a gain characteristic that not only changes the gain according to the variations in the reference signal but also amplifies the output signal of the amplifier circuit in a direction reverse to the direction of the variations in the driving signal that varies according to the reference signal.

The gain of the amplifier circuit has a characteristic that amplifies the output signal in the reverse direction of the variations in the reference signal or the variations in the driving signal of the driving circuit. For example, this gain characteristic is a characteristic that increases or decreases the output signal in the reverse direction of an increase/decrease direction of the reference signal or an increase/decrease direction of the driving signal of the driving circuit determined by variations in the reference signal, whereby an output level of the output signal of the amplifier circuit is kept constant regardless of variations in the reference signal.

When the output signal varies due to variations in the reference signal or variations in the driving signal of the driving circuit, the amplifier circuit amplifies the signal in the direction in which the variations in the output signal are canceled. Therefore, this configuration reduces the effect of the variations in the reference signal, or the effect of the variations in the driving signal of the driving circuit, on the output signal output from the amplifier circuit.

The amplifier circuit of the physical quantity sensor of the present invention comprises an active circuit and a resistance circuit having a plurality of resistor elements wherein the gain is determined by a resistance ratio between the resistor elements. The resistance circuit has a variable resistance circuit in at least a part of the resistor elements, wherein the variable resistance circuit makes the resistance value variable according to variations in the reference signal or variations in the driving signal of the driving circuit.

The variable resistance circuit changes the resistance values of resistor elements to change the resistance ratio and thereby change the gain of the amplifier circuit. Changing the resistance value of the variable resistance circuit according to the variations in the reference signal or the variations in the driving signal of the driving circuit changes the gain of the amplifier circuit according to the variations in the reference signal or the variations in the driving signal of the driving circuit.

The configuration for making the resistance value of this variable resistance circuit variable can be implemented in one of multiple embodiments.

In a first embodiment, the voltage of the reference signal or the driving signal is converted to a frequency which is used to change the resistance value. In a second embodiment, the resistance value is selected and switched according to the voltage of the reference signal or the driving signal. In a third embodiment, the voltage of the reference signal or the driving signal is converted to a current which is used to change the resistance value.

In the embodiments, the gain of the amplifier circuit is made proportional to an increase/decrease in the power supply voltage to provide the physical quantity sensor with the ratiometric characteristic.

The physical quantity sensor in the first embodiment of the present invention converts the voltage of the reference signal or the driving signal to a frequency which is used to change the resistance value. The physical quantity sensor comprises a first frequency converter that converts the level of the reference signal or the driving signal of the driving circuit to a frequency and an amplifier circuit that determines the gain by the resistance ratio between the multiple resistor elements connected to the active circuit.

In this amplifier circuit, a variable resistance circuit that makes the resistance value variable by the pulse modulated signal is formed in at least a part of the multiple resistor elements connected to the active circuit. The resistance value of this variable resistance circuit is changed by the pulse modulated signal with a frequency obtained through the conversion by the first frequency converter to make the gain of the amplifier circuit inversely proportional to an increase/decrease in the reference signal or the driving signal of the driving circuit.

In addition, the physical quantity sensor of the present invention can have the ratiometric characteristic. The ratiometric characteristic can be achieved by making the gain of the amplifier circuit, which outputs the output signal, proportional to an increase/decrease in the power supply voltage.

To provide the ratiometric characteristic, the physical quantity sensor of the present invention further comprises a second frequency converter that converts the power supply voltage to a frequency. In the amplifier circuit, a variable resistance circuit that makes the resistance value variable by the pulse modulated signal is formed in at least a part of the multiple resistor elements connected to the active circuit. The resistance value of the variable resistance circuit is changed by the pulse modulated signal with a frequency, obtained through the conversion by the second frequency converter, to make the gain of the amplifier circuit proportional to an increase/decrease in the power supply voltage.

Therefore, the physical quantity sensor of the present invention can output an output signal that is not affected by the variations in the reference signal and that has the ratiometric characteristic. Both variability resistance against the reference signal and the ratiometric characteristic can be achieved by adjusting the gain of the amplifier circuit. For achieving variability resistance against the reference signal, the gain is adjusted so that the gain is increased or decreased in the reverse direction of an increase/decrease in the reference signal or the driving signal that is dependent on the reference signal. For achieving the ratiometric characteristic, the gain is adjusted so that the gain is proportional to an increase/decrease in the power supply voltage.

To adjust the gain in both cases, a variable resistance circuit is formed in at least a part of the resistor elements, connected to the active circuit of the amplifier circuit, for making the resistance value variable by the pulse modulated signal. The resistance value of this variable resistance circuit is made variable based on the pulse modulated signal generated by converting the reference signal, driving signal, or power supply voltage via the frequency converter.

In a second embodiment of the physical quantity sensor of the present invention, the resistance value is selected and switched according to the voltage of the reference signal and the driving signal. The amplifier circuit is configured to determine the gain by the resistance ratio between a plurality of resistor elements connected to an active circuit, and comprises a voltage-dividing circuit, which divides the voltage of the reference signal or the driving signal of the driving circuit into a predetermined steps, and comparison circuits. This configuration also has both variability resistance against the reference signal and the ratiometric characteristic described above.

In the second embodiment, a variable resistance circuit is formed in at least a part of the plurality of resistor elements for making the resistance value variable. Each of the comparison circuits receives a divided voltage output of the voltage-dividing circuit at one of input ends and receives a voltage, determined by the power supply voltage, at another input end. The variable resistance circuit changes the resistance value by an output signal of each comparison circuit to make the gain of the amplifier circuit inversely proportional to an increase/decrease in the reference signal or the driving signal of the driving circuit and, at the same time, to make the gain proportional to an increase/decrease in the power supply voltage.

This configuration, in which the circuit configuration comprising the voltage-dividing circuit and the comparison circuits is included, allows two types of adjustment to be made: one is to make the gain of the amplifier circuit inversely proportional to an increase/decrease in the reference signal and the driving signal of the driving circuit and the other is to make the gain of the amplifier circuit proportional to an increase/decrease in the power supply voltage.

The amplifier circuit of the physical quantity sensor of the present invention comprises an inverting amplifier circuit or a non-inverting amplifier circuit that has an operational amplifier and an input resistance circuit and a feedback resistance circuit connected to the operational amplifier wherein the gain is determined by a resistance ratio between the input resistance circuit and the feedback resistance circuit. A variable resistance circuit, which makes the resistance value variable according to variations in the reference signal or variations in the driving signal of the driving circuit, is formed in a resistor element of at least one of the input resistance circuit and the feedback resistance circuit. The resistance value of the variable resistance circuit is made variable to change the resistance ratio between the input resistance circuit and the feedback resistance circuit for adjusting the gain.

In a third embodiment of the physical quantity sensor of the present invention, the voltage of the reference signal or the driving signal is changed to a current which is used to change the resistance value. The amplifier circuit has a voltage/current converter that converts the voltage of the reference signal or the voltage of the driving signal of the driving circuit to a current. The variable resistance circuit changes the resistance value by the current obtained by the conversion by this voltage to current converter.

The physical quantity sensor of the present invention can make the output level of the output signal of the amplifier circuit constant against variations in the reference signal. The factors of variations in the reference signal include variations in the reference signal due to a change in the temperature, variations in the power supply voltage supplied to the reference signal formation circuit that forms the reference signal, and variations in the output signal levels caused by the aging of the reference signal formation circuit. The physical quantity sensor of the present invention is compatible with any of those factors.

The physical quantity sensor of the present invention decreases the output level variations in the sensor output when the signal level of the reference signal varies, and keeps the output sensitivity constant.

BRIEF DESCRIPTION OF THE DRAWINGS

FIG. 6A, FIG. 6B, FIG. 6C, FIG. 6D, FIG. 6E and FIG. 6F are diagrams showing the general operation for canceling and decreasing the variations in the reference signal using the reverse characteristic of the gain of the amplifier circuit.

FIG. 10 is a diagram showing the relation between the power supply voltage and the midpoint voltage.

DETAILED DESCRIPTION OF PREFERRED EMBODIMENTS

A physical quantity sensor of the present invention will be described in detail below with reference to the drawings.

The general configuration of the physical quantity sensor of the present invention will be described with reference to FIGS. 1 and 2, and the general configuration of an amplifier circuit provided in the physical quantity sensor of the present invention will be described with reference to FIGS. 3 and 4.

A first embodiment in which the voltage of the reference signal or the driving signal is converted to a frequency for changing the resistance value will be described with reference to FIG. 5 to FIG. 13, a second embodiment in which the resistance value is selected and switched according to the voltage of the reference signal or the driving signal will be described with reference to FIG. 14 and FIG. 15, and a third embodiment in which the voltage of the reference signal or the driving signal is converted to a current for changing the resistance value will be described with reference to FIG. 16.

FIG. 9 to FIG. 12 are diagrams showing the detailed configuration of the physical quantity sensor of the present invention that decreases the output level variations in the sensor output when the signal level of the reference signal varies. FIG. 13 to FIG. 15 show examples of the physical quantity sensor of the present invention that includes two configurations: one is a configuration for stabilizing the output signal level when the reference signal varies, and the other is a configuration for providing the ratiometric characteristic.

Figure 1:
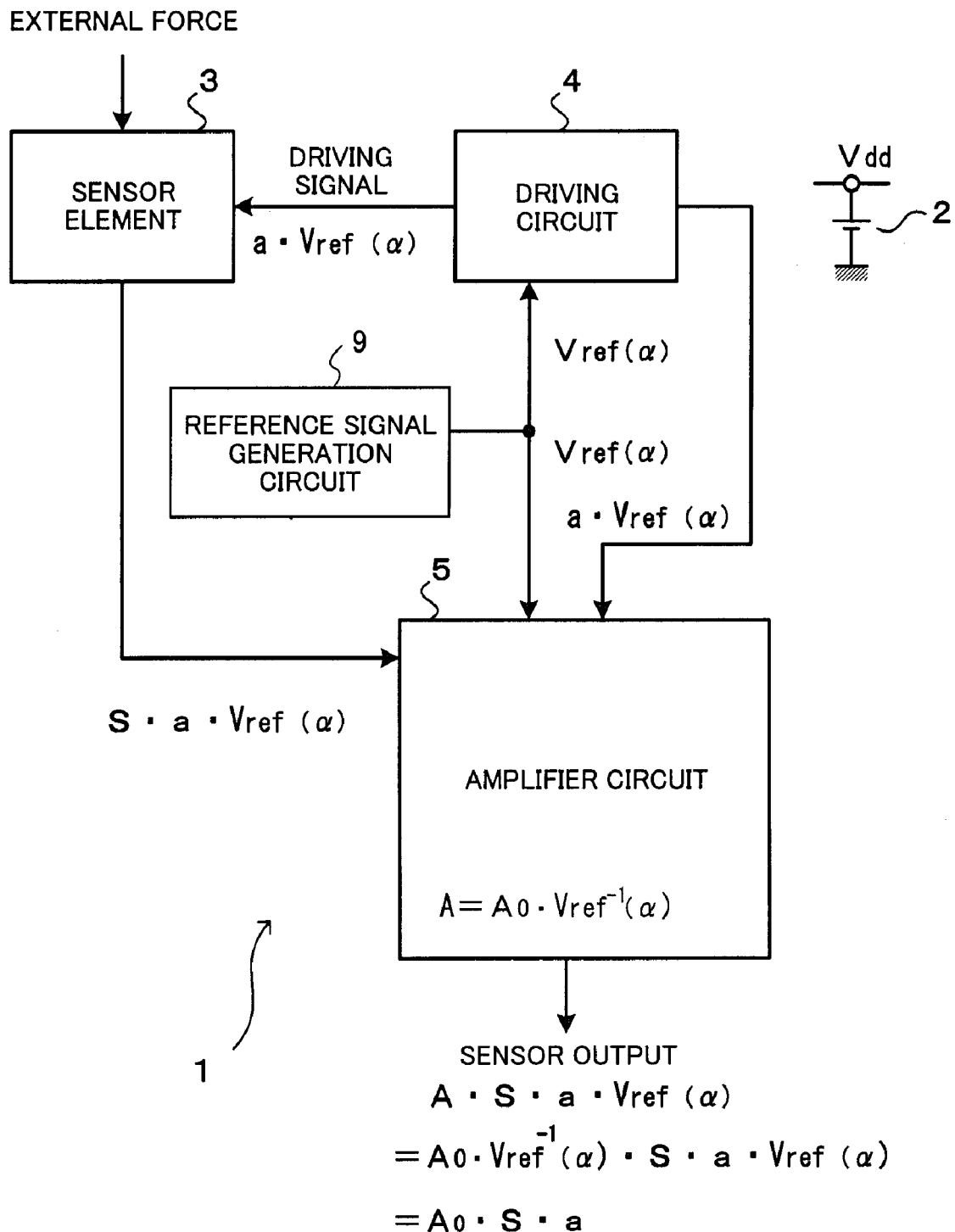
FIG. 1 is a general block diagram showing the general configuration of a physical quantity sensor of the present invention.
Figure 2:
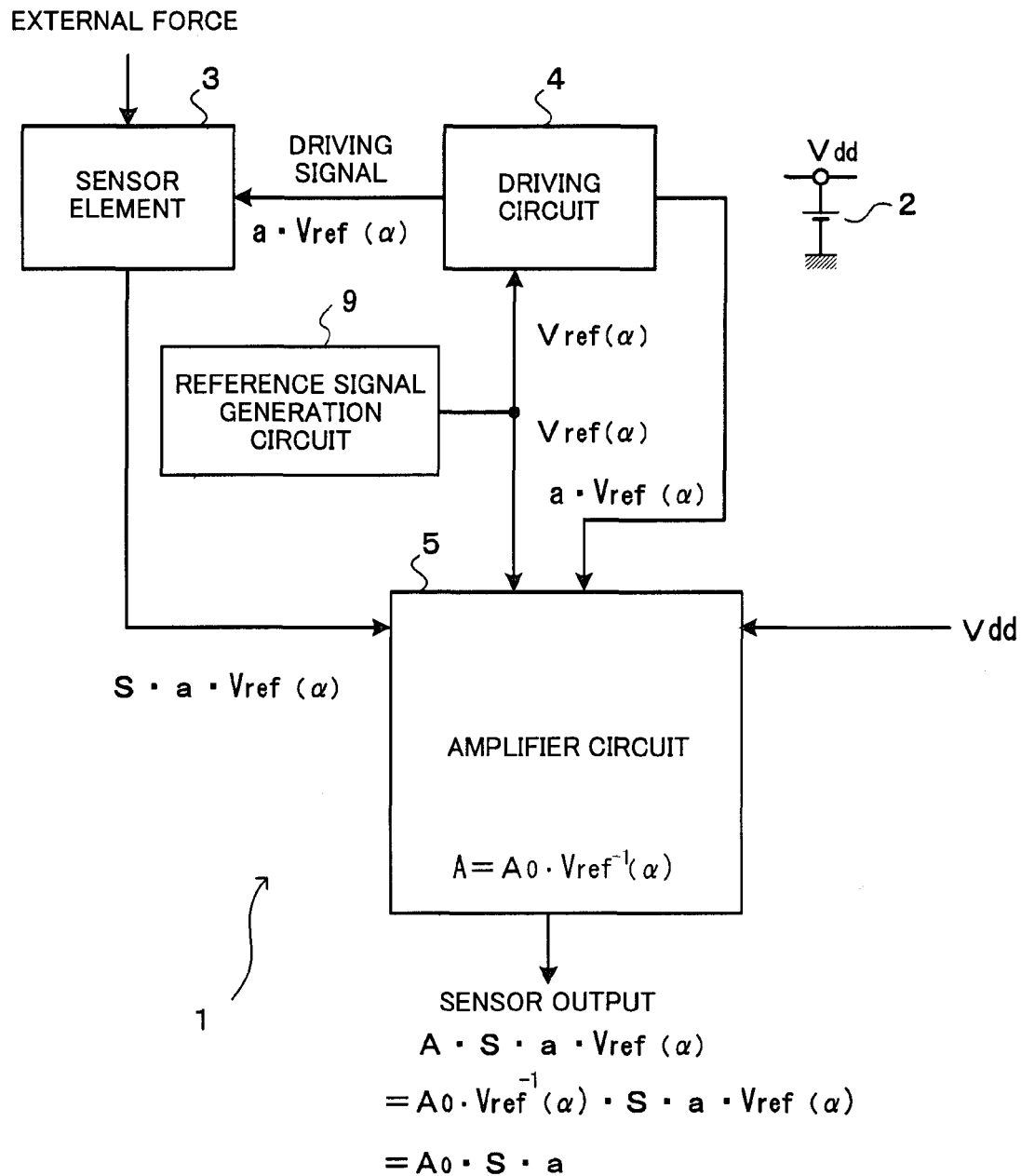
FIG. 2 is a general block diagram showing the general configuration of a physical quantity sensor of the present invention.

FIGS. 1 and 2 are general block diagrams showing the general configuration of the physical quantity sensor of the present invention. FIG. 1 is a diagram showing an example of the configuration of the physical quantity sensor of the present invention that decreases the output level variations in the sensor output when the signal level of the reference signal varies. FIG. 2 is a diagram showing an example of the configuration of the physical quantity sensor of the present invention that has variability resistance against the reference signal for suppressing the output level variations in the sensor output when the signal level of the reference signal varies, as well as the ratiometric characteristic.

Referring to FIGS. 1 and 2, a physical quantity sensor 1 comprises a reference signal generation circuit 9 that generates the reference signal (Vref($\alpha$)), a driving circuit 4 that generates the driving signal based on the reference signal (Vref($\alpha$)), a sensor element 3 that is driven by the driving circuit 4 to convert an externally applied physical quantity to an electrical signal, and an amplifier circuit 5 that amplifies the output signal of the sensor element 3, changes the gain based on the reference signal (Vref($\alpha$)), and outputs the output signal according to variations in the reference signal (Vref($\alpha$)).

The driving circuit 4 controls the driving signal, which is supplied to the sensor element 3, so that the driving signal level becomes constant based on the reference signal (Vref ($\alpha$)) formed independently of a voltage source 2. In FIGS. 1 and 2, the driving signal is indicated by a·Vref($\alpha$). Here, "a" is a coefficient representing the relation between the driving signal and the reference signal (Vref($\alpha$)) in the driving circuit 4. The reference signal (Vref($\alpha$)) varies according to temperature variations, power supply voltage variations, or the aging of the reference signal formation means that forms the reference signal. So, the reference signal can be represented as the reference signal Vref($\alpha$) where "a" is a variation parameter. In the description below, the reference signal Vref is represented as Vref($\alpha$).

The sensor element 3, which is driven by the driving signal a·Vref($\alpha$) received from the driving circuit 4, outputs the output signal corresponding to an external force. Here, the output signal from the sensor element 3 can be represented as S·a·Vref($\alpha$) where S is the contribution factor of the amplitude of the output signal from the sensor element 3 that is generated by the external force.

The amplifier circuit 5 amplifies the signal (S·a·Vref($\alpha$)) received from the sensor element 3 and outputs the amplified signal. This amplifier circuit 5 outputs the output signal A·S·a·Vref($\alpha$) generated by multiplying the received S·a·Vref ($\alpha$) by A where "A" is the gain.

Here, the signal level of the output signal can be made constant regardless of the variations in the reference signal Vref($\alpha$) by changing the gain A based on the variations in the reference signal Vref($\alpha$) that varies according to the variation parameter "$\alpha$".

To do so, the gain A of the amplifier circuit 5 is changed so that the amplifier circuit 5 has the reverse characteristic of the variation characteristic of the reference signal Vref($\alpha$). This makes the output signal level constant regardless of the variations in the reference signal Vref($\alpha$).

In this case, by changing the gain A of the amplifier circuit 5 so that amplifier circuit has the reverse characteristic of the variation characteristic of the reference signal Vref($\alpha$), it is possible to cancel those variations and to remove the variation characteristic of the reference signal Vref($\alpha$) from the output signal even when the reference signal varies and, as a result, the output signal of the sensor element 3 varies.

When the opposite characteristic is represented as Vref$^{-1}$($\alpha$), the gain A of the amplifier circuit 5 is represented as $A_0$·Vref$^{-1}$($\alpha$). Here, the relation between Vref($\alpha$) and Vref$^{-1}$($\alpha$) can be represented as Vref($\alpha$) ·Vref$^{-1}$($\alpha$)=1 and, therefore, the output signal A·S·a·Vref($\alpha$) of the amplifier circuit 5 can be represented as follows.

$$A \cdot S \cdot a \cdot Vref(\alpha) = A_0 \cdot Vref^{-1}(\alpha) \cdot S \cdot a \cdot Vref(\alpha) = A_0 \cdot S \cdot a$$

The above expression indicates that the output signal A·S·a·Vref($\alpha$) is independent of the reference signal Vref($\alpha$). In the above description, $A_0$ is the gain that is set.

Referring to FIG. 2, the amplifier circuit 5 receives the power supply voltage Vdd and adjusts the gain so that the gain is proportional to an increase/decrease in the power supply voltage Vdd. This adjustment allows the output signal to have the ratiometric characteristic. This configuration allows the detection sensitivity of the physical quantity sensor to change in proportion to a change in the power supply voltage.

The following describes examples of the configuration of the amplifier circuit provided in the physical quantity sensor of the present invention with reference to FIG. 3 and FIG. 4.

Figure 3A:
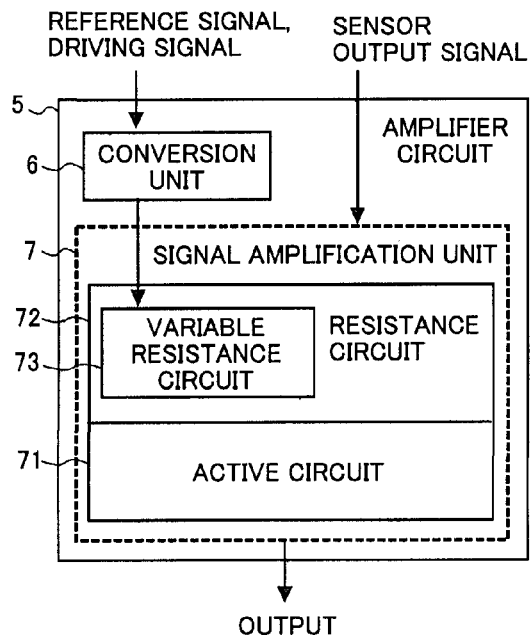
FIG. 3A, FIG. 3B and FIG. 3C are diagrams showing examples of the configuration of an amplifier circuit provided in the physical quantity sensor of the present invention.
Figure 3C:
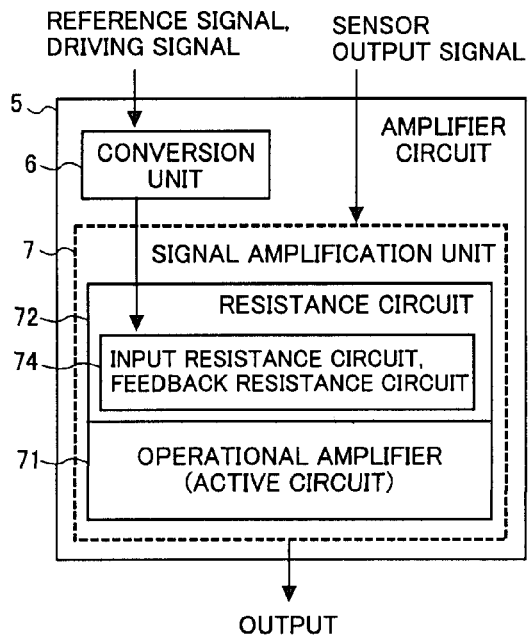
Figure 3B:
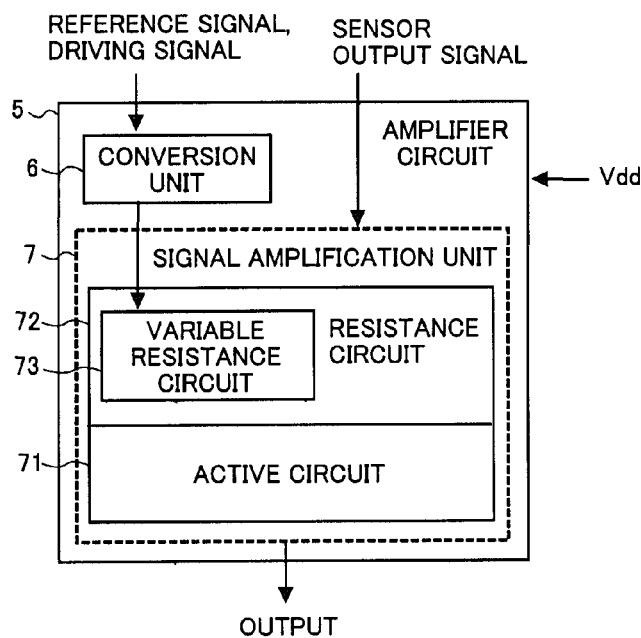

Referring to FIGS. 3A and 3B, the amplifier circuit 5 has a signal amplification unit 7 that can increase or decrease the gain. The signal amplification unit 7, which comprises an active circuit 71 and a resistance circuit 72 having multiple resistor elements, determines the gain according to the resistance ratio of the resistor elements. At least one of the resistor elements in the resistance circuit 72 is a variable resistance circuit 73. This variable resistance circuit 73 changes the resistance value according to the reference signal or the driving signal.

The signal amplification unit 7 performs the amplifier circuit operation via the resistance circuit 72 and the active circuit 71 to change the resistance value of the variable resistance circuit 73 in the resistance circuit 72 and thereby to increase or decrease the gain. Changing the resistance value of this variable resistance circuit 73 according to the reference signal or the driving signal can increase or decrease the gain according to the reference signal or the driving signal. The resistance value of the variable resistance circuit 73 is increased or decreased based on the parameter generated by a conversion unit 6 by converting the voltage of the reference signal or the driving signal. FIG. 3B shows the configuration in which the resistance value of the variable resistance circuit 73 is increased or decreased in proportion to an increase/ decreased in the power supply voltage.

This configuration provides variability resistance against the reference signal for decreasing the output level variations in the sensor output against the variations in the signal level of the reference signal, as well as the ratiometric characteristic.

Referring to FIG. 3C, the signal amplification unit 7 can be constructed as an inverting amplifier circuit or a non-inverting amplifier circuit in which the active circuit 71 is used as an operational amplifier, the variable resistance circuit 73 includes an input resistance circuit and a feedback resistance circuit, and the input resistance circuit and the feedback resistance circuit are connected to the operational amplifier. The gain of the signal amplification unit 7 is defined by the resistance value ratio between the input resistance circuit and the feedback resistance circuit. A resistor element included in at least one of the input resistance circuit and the feedback resistance circuit forms a variable resistance circuit that makes the resistance value variable when the reference signal varies or the driving signal output from the driving circuit varies.

Figure 4A:
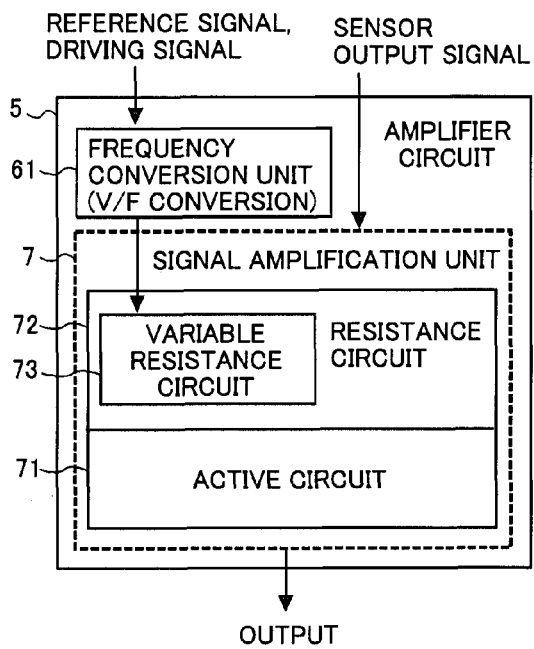
FIG. 4A, FIG. 4B and FIG. 4C are diagrams showing examples of the configuration of a conversion circuit provided in the physical quantity sensor of the present invention.
Figure 4B:
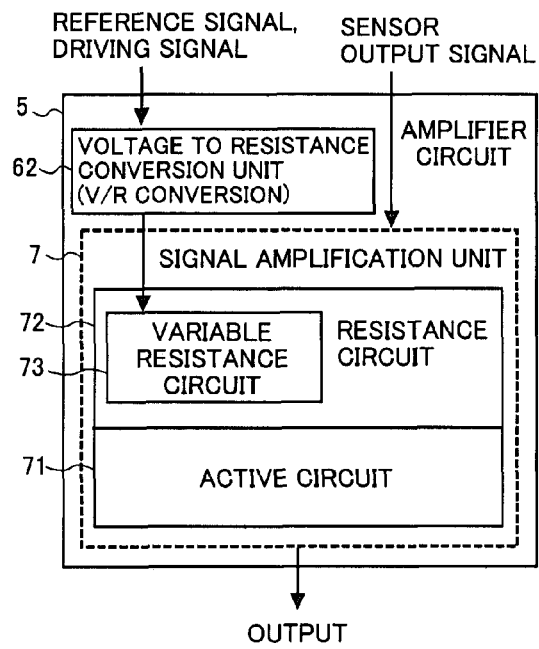
Figure 4C:
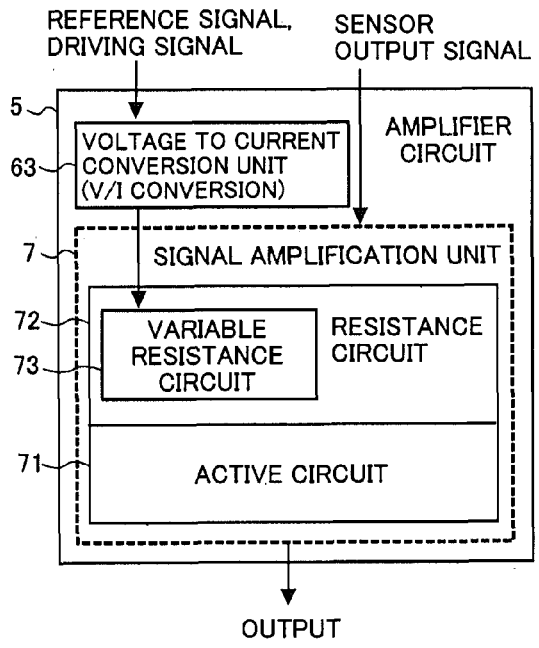

FIG. 4 is a diagram showing the configurations of the conversion circuit. FIG. 4A to FIG. 4C show the configurations in which the voltage of the reference signal or the driving signal is converted to the frequency, resistance, and current parameters.

In the configuration shown in FIG. 4A, a frequency conversion unit 61 is used as the conversion unit 6 to convert the voltage of the reference signal or the driving signal to a frequency parameter for increasing or decreasing the resistance value of the variable resistance circuit 73 using the frequency. In the configuration shown in FIG. 4B, a voltage to resistance conversion unit 62 is used as the conversion unit 6 to convert the voltage of the reference signal or the driving signal to a resistance parameter for increasing or decreasing the resistance value of the variable resistance circuit 73 using the resistance. In the configuration shown in FIG. 4C, a voltage to current conversion unit 63 is used as the conversion unit 6 to convert the voltage of the reference signal or the driving signal to a current parameter for increasing or decreasing the resistance value of the variable resistance circuit 73 using the current.

Figure 5:
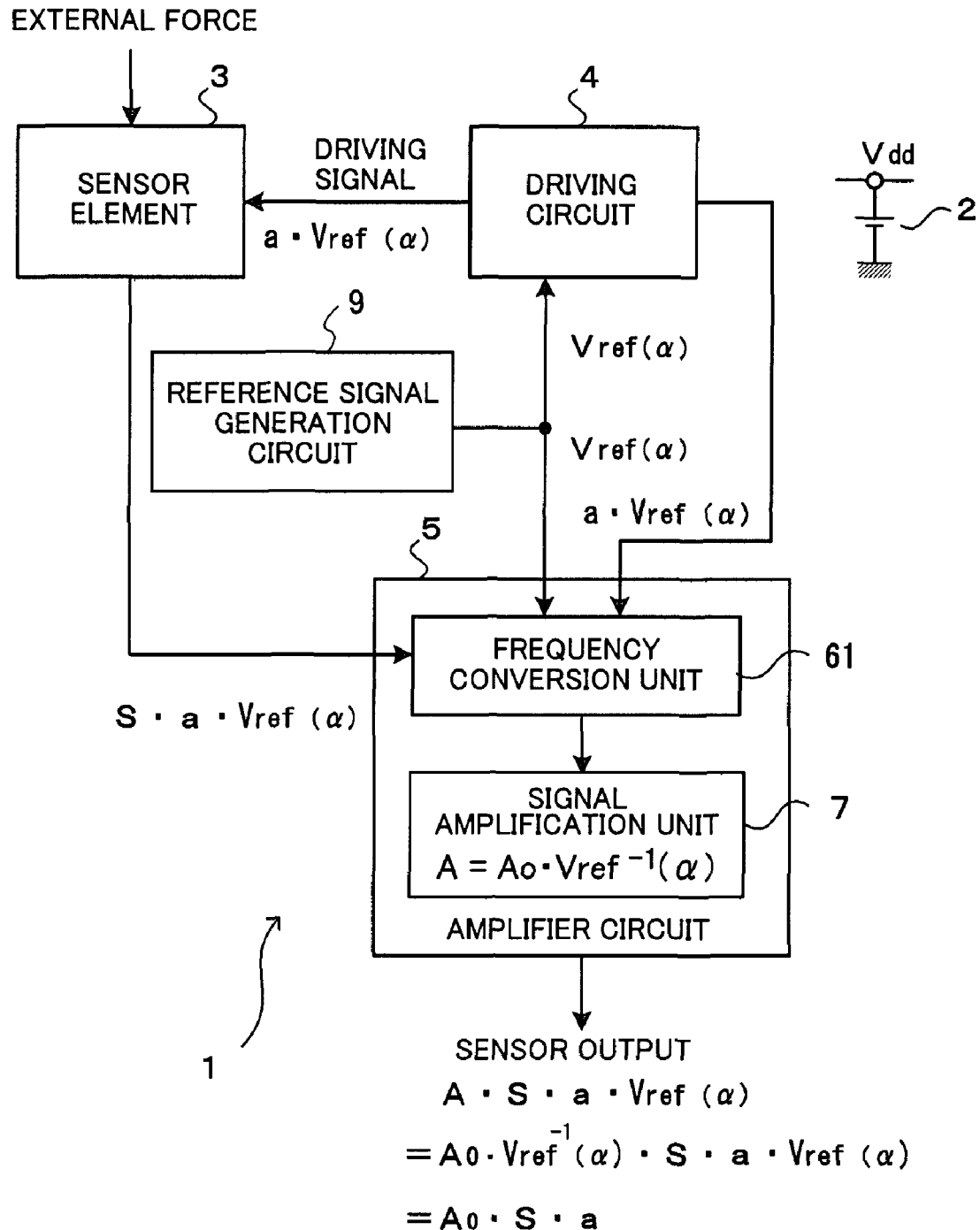
FIG. 5 is a diagram showing the general configuration of a physical quantity sensor in a first embodiment of the present invention that converts the resistance value via voltage to frequency conversion.
Figure 7:
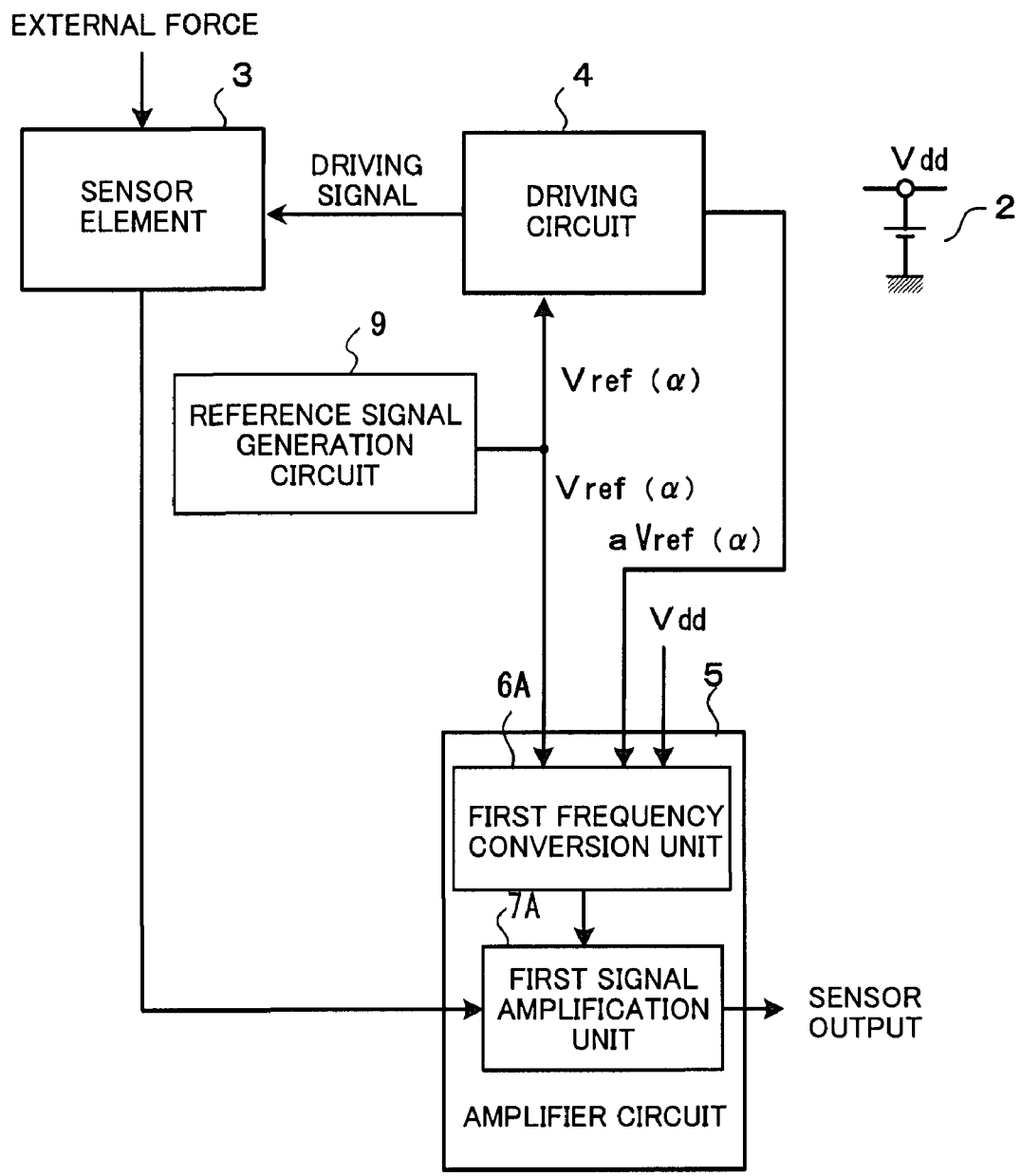
FIG. 7 is a diagram showing an example of the general configuration of the physical quantity sensor in the first embodiment of the present invention in which both variability resistance against the reference signal and ratiometric characteristic are provided.
Figure 8:
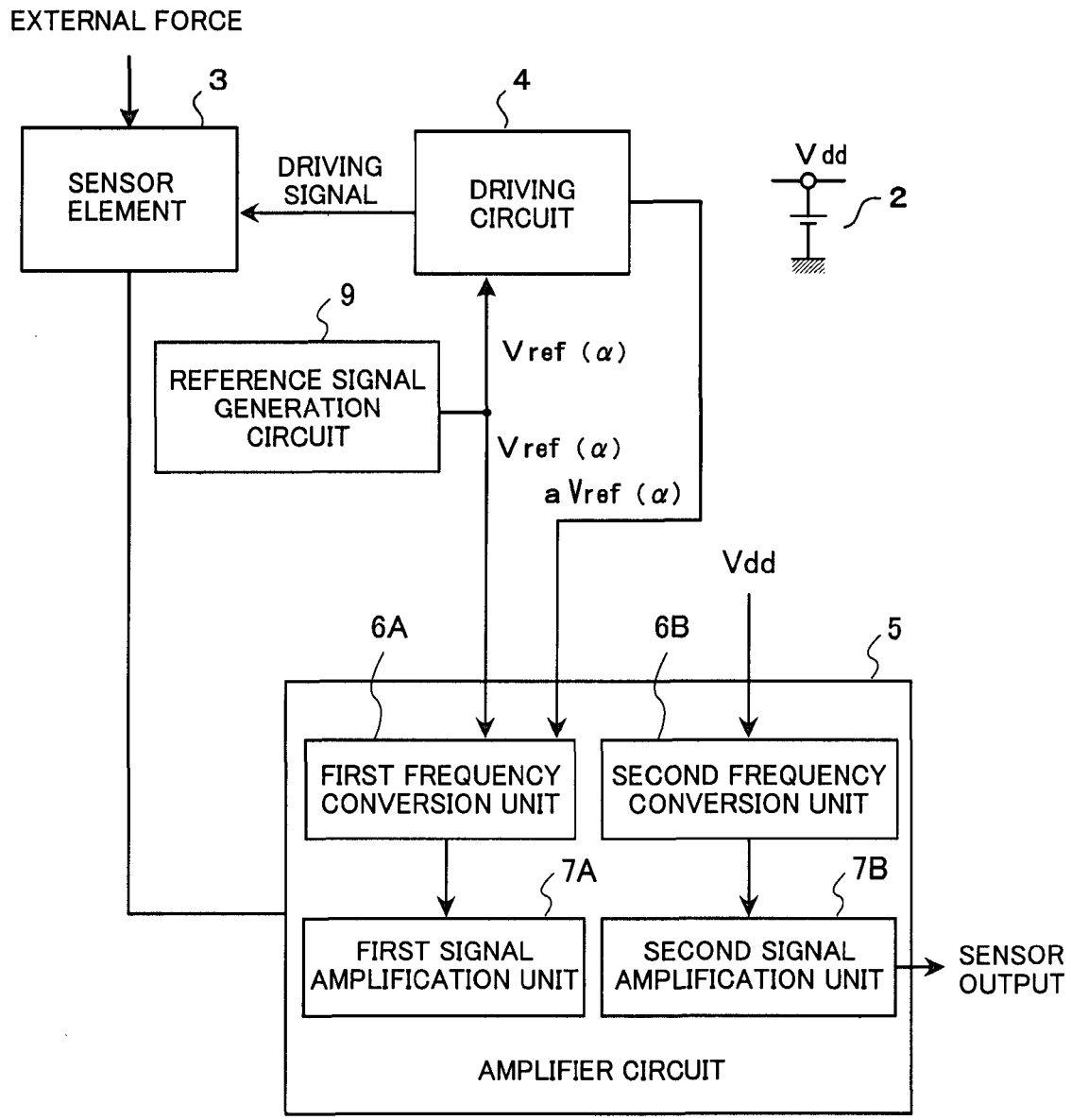
FIG. 8 is a diagram showing an example of the general configuration of the physical quantity sensor in the first embodiment of the present invention in which both variability resistance against the reference signal and ratiometric characteristic are provided.

The following describes the operation of the configuration shown in FIG. 4A with reference to FIG. 5 to FIG. 8. FIG. 5 is a diagram showing an example of the configuration of the physical quantity sensor of the present invention that decreases the variations in the output level of the sensor output when the signal level of the reference signal varies. On the other hand, FIGS. 7 and 8 are diagrams showing examples of the configuration of the physical quantity sensor of the present invention that provides variability resistance against the reference signal for decreasing the output level variations in the sensor output when the signal level of the reference signal varies, as well as the ratiometric characteristic.

The example of the configuration shown in FIG. 5 is the example of the configuration shown in FIG. 1 wherein the frequency conversion unit 61 and the signal amplification unit 7 constitute the amplifier circuit 5. Because FIG. 5 is different from FIG. 1 only in the configuration of the amplifier circuit 5, only the configuration of the amplifier circuit 5 is described below and the description of the common part is omitted.

The driving circuit 4 controls the driving signal of the sensor element 3, based on the reference signal (Vref($\alpha$)) formed by the reference signal generation circuit 9 independently of the voltage source 2, so that the level of the driving signal is at a fixed level.

The sensor element 3, which is driven by the driving signal a·Vref($\alpha$) received from the driving circuit 4, outputs the output signal S·a·Vref($\alpha$) corresponding to an external force. "a" is a coefficient representing the relation between the driving signal and the reference signal, and "S" is the contribution factor of the amplitude of the output signal of the sensor element 3 generated by the external force.

The frequency conversion unit 61 included in the amplifier circuit 5 receives the voltage of the output signal S·a·Vref($\alpha$) of the sensor element 3 and the voltage of the reference signal Vref($\alpha$) or the driving signal a·Vref($\alpha$) and converts the received voltage to a frequency.

The frequency conversion unit 61 changes the resistance ratio of the variable resistance circuit to change the gain "A", multiplies the received S·a·Vref($\alpha$) by A, and outputs the output signal A·S·a·Vref($\alpha$).

By adjusting the gain A based on the variations in the reference signal Vref($\alpha$) that varies according to the variation parameter "·", the signal level of the output signal is kept constant regardless of the variations in the reference signal Vref($\alpha$). To do so, the signal amplification unit 7 adjusts the gain A so that it provides the reverse characteristic of the variation characteristic of the reference signal Vref($\alpha$), thus making the signal level of the output signal constant regardless of the variations in the reference signal Vref($\alpha$).

FIG. 6 is a general diagram showing the operation for canceling and decreasing the variations in the reference signal using the reverse characteristic of the gain of the amplifier circuit.

FIGS. 6A-6C show a case in which the gain of the amplifier circuit does not change when the reference signal varies. On the other hand, FIGS. 6D-6F show a case in which the amplifier circuit has the gain of the reverse characteristic. FIG. 6A and FIG. 6D show the characteristic of the reference signal Vref($\alpha$) for the variation parameter $\alpha$, FIG. 6B and FIG. 6E show the gain for the variation parameter $\alpha$, and FIG. 6C and FIG. 6F show the output signal for the variation parameter $\alpha$.

In the case where the gain of the amplifier circuit does not change when the reference signal varies (FIG. 6B), the variations in the reference signal Vref($\alpha$) are reflected on the output signal. So, when the reference signal Vref($\alpha$) varies according to the variation parameter $\alpha$ (FIG. 6A), the output signal varies according to the variations in the reference signal Vref($\alpha$) (FIG. 6C).

On the other hand, in the case where the gain of the amplifier circuit is changed when the reference signal varies (FIG. 6E), the variations in the reference signal Vref($\alpha$) are canceled by the variations in the gain (FIG. 6F). So, even when the reference signal Vref($\alpha$) varies according to the variation parameter $\alpha$, the output signal remains constant regardless of the variations in the reference signal Vref($\alpha$) (FIG. 6F). For example, when the reference signal Vref($\alpha$) is represented as (a$\alpha$+b) for the variation parameter $\alpha$ (FIG. 6D), the gain A is changed in inverse proportion to the variations in the reference signal Vref($\alpha$) (for example, $A_0/(a\alpha+b)$). As a result, the output signal is amplified with the gain $A_0$ regardless of the variations in the reference signal Vref($\alpha$) and therefore the effect of the variation parameter $\alpha$ is removed.

To change the gain A of the signal amplification unit 7 according to the reference signal Vref($\alpha$) or the driving signal a·Vref($\alpha$), the amplifier circuit 5 uses the frequency conversion unit 61 to convert the reference signal Vref($\alpha$) or the driving signal a·Vref($\alpha$) to the frequency signal. The signal amplification unit 7 uses this frequency signal, obtained by the conversion of the frequency conversion unit 61, to change the resistance value of the variable resistance circuit connected to the active circuit and, by doing so, changes the gain. The circuit configuration for changing the gain using this frequency signal will be described later with reference to the circuit examples in FIGS. 11 and 12.

FIGS. 7 and 8 show examples of the configuration of the physical quantity sensor of the present invention that has the configuration in which, as in FIG. 5, the output level variations in the sensor output are decreased when the signal level of the reference signal varies and, in addition, the configuration in which the ratiometric characteristic is provided to make the gain of the amplifier circuit variable in proportion to the variations in the power supply voltage. The configuration already described in FIG. 5 will be omitted in the description below.

In FIGS. 7 and 8, the physical quantity sensor 1 has the same configuration as that shown in FIG. 5 and comprises the sensor element 3, driving circuit 4, amplifier circuit 5, and reference signal generation circuit 9. The amplifier circuit 5 has the following two configurations. In one configuration, the signal is amplified by again having the characteristic reverse to the variations in the reference signal Vref($\alpha$) to decrease the output level variations in the sensor output when the signal level of the reference signal varies. In the other configuration, the signal is amplified by a gain having the characteristic in the same direction as that of the variations in the power supply voltage Vdd to decrease the output level variations in the sensor output when the power supply voltage varies.

In the configuration shown in FIG. 7, the amplifier circuit 5 changes the gain A based on the reverse characteristic of the reference signal Vref($\alpha$) or the driving signal a·Vref($\alpha$). For example, in addition to a first signal amplification unit 7A, the amplifier circuit 5 has a first frequency conversion unit 6A that converts the reference signal Vref($\alpha$) or the driving signal a·Vref($\alpha$) to a frequency signal. The first signal amplification unit 7A uses the frequency signal, obtained by the conversion of the first frequency conversion unit 6A, to change the resistance value of the variable resistance circuit connected to the active circuit and thereby changes the gain. In addition, the first frequency conversion unit 6A also receives the power supply voltage Vdd, and the first signal amplification unit 7A uses the frequency signal, converted by the first frequency conversion unit 6A, to change the resistance value of the variable resistance circuit connected to the active circuit and thereby changes the gain in proportion to the power supply voltage Vdd.

In the configuration shown in FIG. 8, the amplifier circuit 5 changes the gain A of the amplifier circuit based on the same increase/decrease characteristic as that of the power supply voltage Vdd. For example, the amplifier circuit 5 has a second signal amplification unit 7B and a second frequency conversion unit 6B that converts the power supply voltage Vdd to a frequency signal. The second signal amplification unit 7B uses the frequency signal, obtained by the conversion of the second frequency conversion unit 6B, to change the resistance value of the variable resistance circuit connected to the active circuit and thereby changes the gain in proportion to the power supply voltage Vdd.

In addition, the first signal amplification unit 7A and the second signal amplification unit 7B can be combined into one amplifier circuit. An example of the configuration of this amplifier circuit, which has the two functions described above, will be described later with reference to FIG. 13 to FIG. 16. The two functions are the function to change the gain based on the variations in the reference signal or the driving signal and the function to change the gain based on the variations in the power supply voltage.

Next, with reference to FIG. 9 to FIG. 12, the following describes an example of the detailed configuration of the physical quantity sensor of the present invention that decreases the variations in the output level of the sensor output when the signal level of the reference signal varies.

Figure 9:
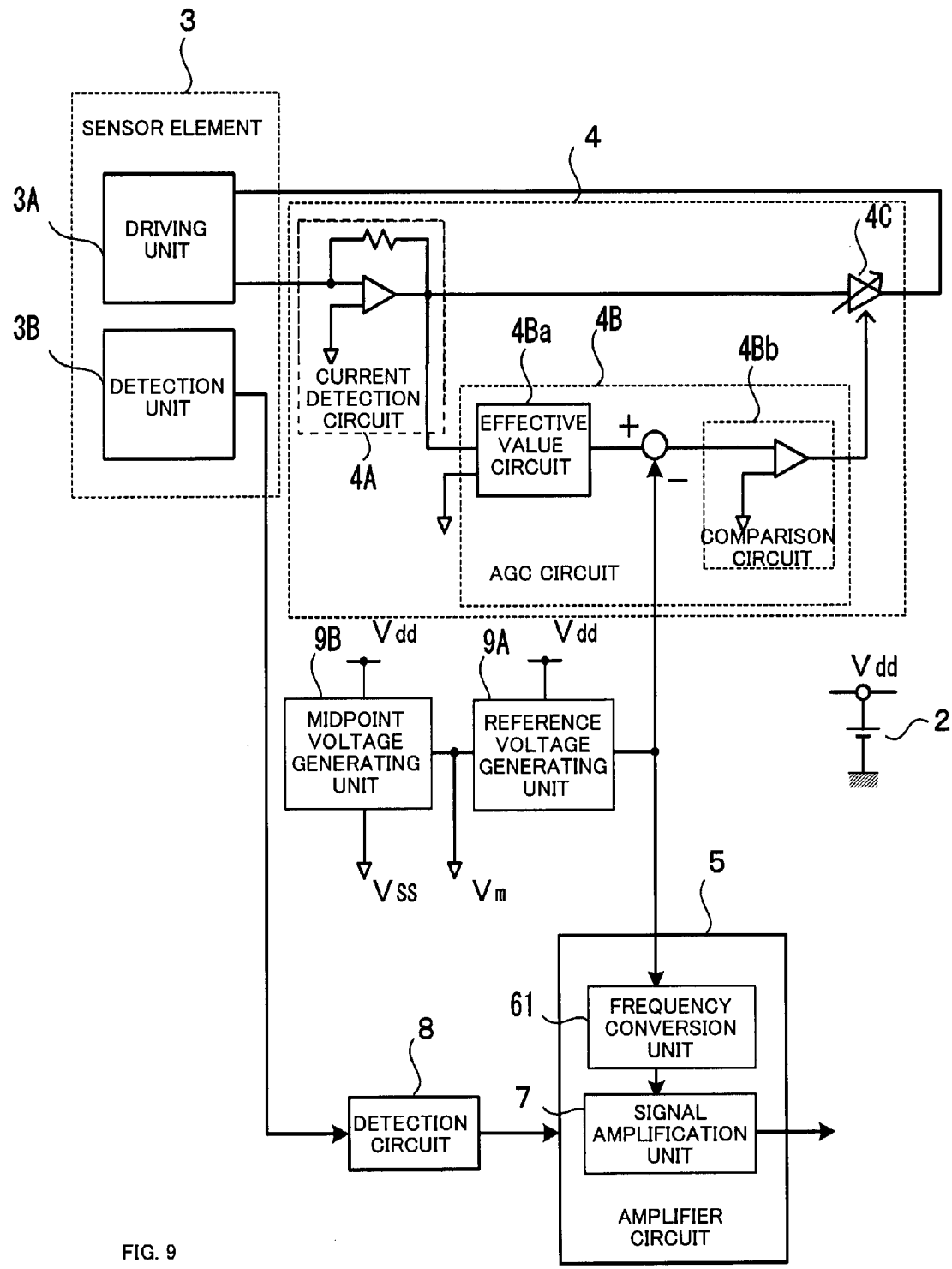
FIG. 9 is a diagram showing the configuration of the physical quantity sensor in the first embodiment of the present invention.

FIG. 9 is a block diagram showing an example of the configuration of the physical quantity sensor of the present invention, and this figure shows the configuration in FIG. 5 more in detail. Because the general configuration of the sensor element 3, driving circuit 4, amplifier circuit 5, and reference signal generation circuit 9 is already described in FIG. 5, the description is omitted here and an example of configuration of each circuit will be described.

The sensor element 3, which may be configured by a piezoelectric vibrator such as a crystal resonator, comprises a driving unit 3A that excites and vibrates the piezoelectric vibrator and a detection unit 3B whose vibration state is changed by an externally-applied force. For example, when the piezoelectric vibrator is configured by a tuning-fork-type piezoelectric vibrator that has multiple legs, the driving unit 3A comprises a driving leg and a driving electrode provided on the driving leg and is excited by the driving signal, supplied from the driving circuit 4, for oscillation and vibration.

On the other hand, the detection unit 3B comprises a detection leg and a detection electrode provided on the detection leg. For example, the vibration state of the detection leg is changed by the Coriolis force generated by an externally-applied force, and the detection electrode detects this vibration state as the detection signal. The detection unit 3B outputs the detection signal to the amplifier circuit 5 via a detection circuit 8.

The driving circuit 4 is a circuit that forms the driving signal for exciting and driving the driving unit 3A of the sensor element 3. The driving circuit 4 feeds back the signal from the driving unit 3A to adjust the phase and the amplitude for forming a driving signal at a predetermined frequency. FIG. 9 shows an example of the constant current control in which the current value of the driving signal is controlled at a fixed value.

A current detection circuit 4A detects the current of a signal detected at one of the electrodes of the driving unit 3A, and an Automatic Gain Control circuit (AGC circuit) 4B forms a control signal that makes the current value of this detected signal constant and adjusts the gain of a gain-variable amplifier circuit 4C using this control signal. For example, the Automatic Gain Control circuit (AGC circuit) 4B comprises an effective value circuit 4Ba that calculates the effective value of the output signal of the current detection circuit 4A and a comparison circuit 4Bb that calculates the difference between the output of the effective value circuit 4Ba and the reference signal Vref and compares the difference with a setting value. In this configuration, the current value of the driving signal is compared with the reference signal, and the gain of the gain-variable amplifier circuit 4C is adjusted so that the current value of the driving signal becomes constant with the reference signal as the base signal.

Figure 10:
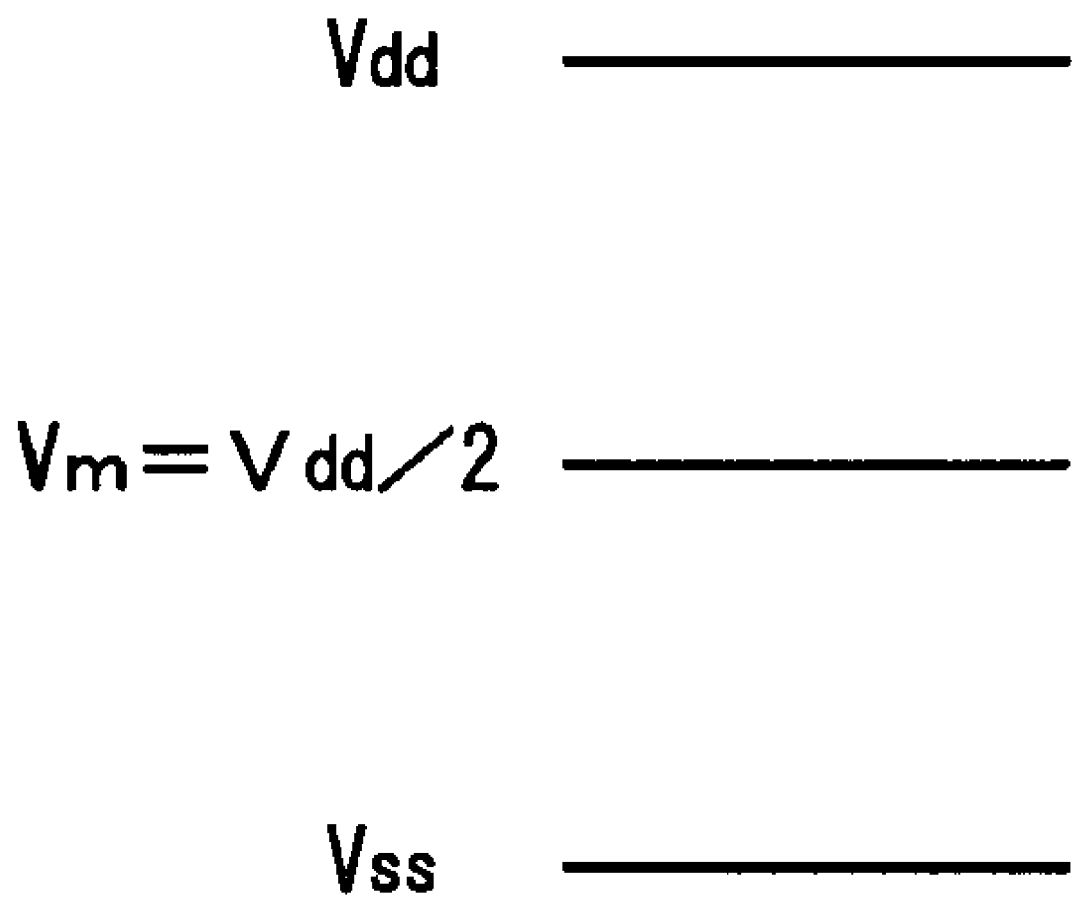

The reference signal (Vref($\alpha$)) can be generated by a midpoint voltage generating unit 9B and a reference voltage generating unit 9A. The midpoint voltage generating unit 9B and the reference voltage generating unit 9A receive the voltage from the voltage source 2. For example, the midpoint voltage generating unit 9B generates Vm from the midpoint between the voltage Vdd of the voltage source 2 and Vss. When Vss is at the ground voltage, the midpoint voltage Vm is Vdd/2. FIG. 10 shows this voltage relation.

The reference voltage generating unit 9A uses the midpoint voltage Vm, generated by the midpoint voltage generating unit 9B, to generate a voltage independent of the power supply voltage Vdd. The problem is that, the reference voltage generating unit 9A generates the reference signal as the base signal for making the current of the driving signal formed by the driving circuit 4 constant, and the signal level of the reference signal varies according to the temperature, power supply voltage, or aging in the actual circuit configuration. Those variations in the signal level of the reference signal vary the signal level of the driving signal and become a factor that varies the signal level of the output signal that is output via the sensor element 3 and the signal amplification unit 7. The present invention decreases the variations in the output signal generated by the variations in the reference signal that is used as the base signal.

In the signal amplification unit 7 included in the amplifier circuit 5 of the present invention for making the gain variable, at least one of multiple resistor elements connected to the active circuit of the amplifier circuit is configured by a variable resistance circuit, and the resistance value of this variable resistance circuit is made variable for changing the gain of the amplifier circuit.

Referring to the circuit configuration shown in FIG. 11 and FIG. 12, the following describes the detailed configuration for decreasing the output level variations in the sensor output when the signal level of the reference signal varies.

Figure 11A:
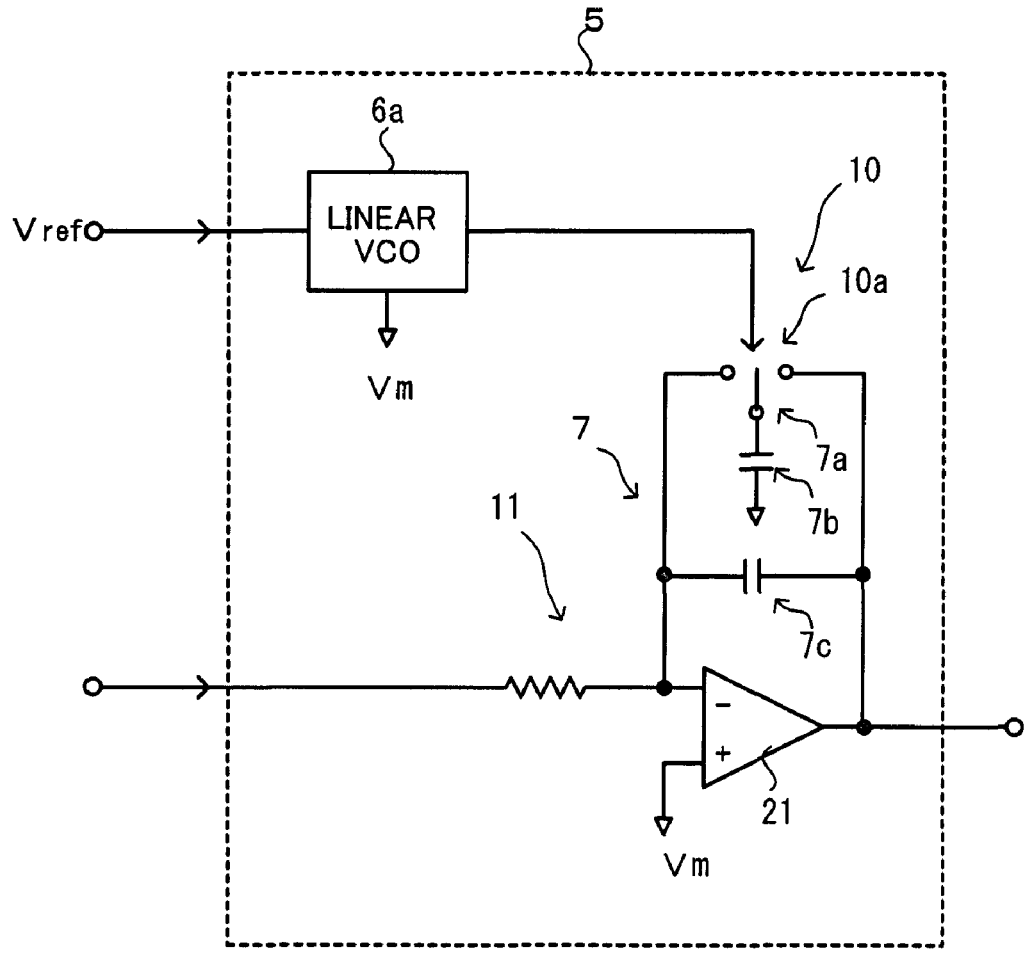
FIG. 11A and FIG. 11B are diagrams showing examples of the configuration, in which the output level variations in the sensor output are decreased when the signal level of the reference signal varies, in the physical quantity sensor in the first embodiment of the present invention.
Figure 11B:
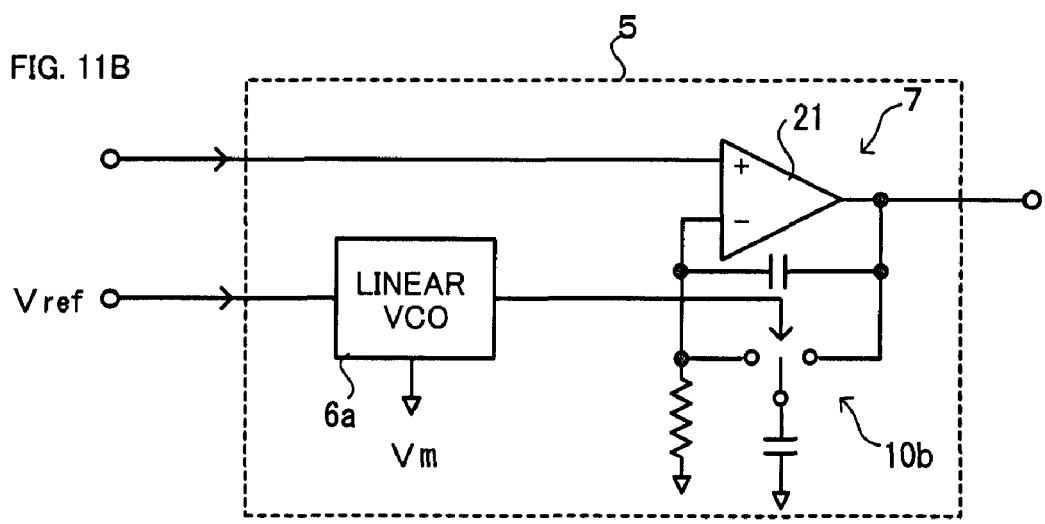

FIG. 11A shows an example of an inverting amplifier circuit, and FIG. 11B shows an example of a non-inverting amplifier circuit. Although the signs are reversed, the magnitude of the gain of an inverting amplifier circuit and a non-inverting amplifier circuit is determined by the input resistance Rs and the feedback resistance Rf connected to the operational amplifier (OP Amp). The following description is based primarily on the example of the inverting amplifier circuit in FIG. 11A.

In FIG. 11A, the amplifier circuit 5 comprises a frequency converter (linear VCO) 6a which converts the voltage of the reference signal Vref to a frequency and the signal amplification unit 7 in which an input resistor 11 and a feedback resistor 10 of the operational amplifier (OP amp) are connected.

Because the gain of the signal amplification unit 7 is defined as (−Rf/RS), forming the feedback resistor 10 with a variable resistance circuit 10a and changing the resistance value of this variable resistance circuit 10a using the reference signal Vref, which has been converted to a frequency signal by the frequency conversion unit (linear VCO) 6a, allow the increase/decrease direction of the gain to be adjusted in the opposite direction of the variation direction of the reference signal Vref. For example, when the reference signal Vref is increased, the resistance value of the variable resistance circuit 10a is decreased to decrease the gain of the signal amplification unit 7; conversely, when the reference signal Vref is decreased, the resistance value of the variable resistance circuit 10a is increased to increase the gain of the signal amplification unit 7.

The relation among the reference signal, the frequency signal, the resistance value of the variable resistance circuit, and the gain is as follows. That is, the reference signal and the frequency signal have the forward increase characteristic, the frequency signal and the resistance value have the reverse increase characteristic, and the resistance value and the gain have the same increase characteristic. This means that the reference signal and the gain have the reverse increase characteristic, meaning that the gain is decreased when the reference signal is increased and that the gain is increased when the reference signal is decreased. Therefore, the gain of the amplifier circuit has the reverse characteristic of the reference signal.

To increase or decrease the resistance value of this variable resistance circuit, the so-called switched capacitor circuit, which transfers charges by switching the capacitor connection state, is provided in the feedback stage. The gain of this switched capacitor circuit is made variable based on the pulse modulated signal.

The amplification circuit 7 shown in FIG. 11A has the configuration of an inverting amplifier circuit having an operational amplifier (OP Amp) 21. A switched capacitor circuit and a filter capacitor 7c, which are connected in parallel to form the variable resistance circuit 10a, are connected between the output end and the input end (inverting input terminal) of the operational amplifier (OP Amp) 21 as the feedback resistor, and the input resistor 11 is connected to the inverting input terminal of the operational amplifier (OP Amp) 21. The switched capacitor circuit is configured by a switch 7a, which has two contacts, and a capacitor 7b.

The switch 7a can be configured by a transfer gate (transmission gate) implemented by a MOS element, and the contact state of the switch 7a is configured in such a way that the contact state is switched according to the frequency signal from the frequency converter 6a. That is, the connection state of the capacitor is switched according to the frequency signal. The switch 7a can be fabricated in the semiconductor process in the same way as the capacitors 7b and 7c and the input resistor 11, and can be configured on the same semiconductor chip. This configuration allows the elements to have the same temperature characteristic.

One end of the capacitor 7b is connected to the midpoint voltage Vm, and the other end is connected to a fixed contact of the switch 7a. The switch 7a, as well as filter capacitor 7c, is connected between the inverting input terminal and the output terminal of the operational amplifier (OP Amp) 21. The non-inverting input terminal of the operational amplifier (OP Amp) 21 is connected to the mid-point voltage Vm.

The switched capacitor circuit comprises the switch 7a and the capacitor 7b. When the contact of the switch 7a is connected to the inverting input terminal side, the capacitor 7b stores the voltage of the detection output; next, when the switch 7a is connected to the output terminal side, the charge stored in the capacitor 7b is discharged.

As described above, the connection state of the capacitor 7b is switched by switching the switch 7a between the inverting input terminal side and the signal terminal side according to the frequency signal of the frequency converter 6a.

The high-speed switching operation of the switch 7a described above causes the switched capacitor circuit to perform the operation equivalent to an resistor element whose resistance value can be represented as Re=1/(f·Cs), where f is the average switching frequency of the switch 7a and Cs is the capacity of the capacitor 7b.

Because the switched capacitor circuit that is equivalent to a resistor element forms a variable resistance circuit, the signal amplification unit 7 works as a primary low-pass filter (incomplete integration circuit) implemented by the inverting amplifier circuit. In this case, the gain of the signal amplification unit 7 is determined by the ratio between the feedback resistance and the input resistance. Therefore, in the configuration described above, the gain of the amplifier circuit can be made variable in the reverse direction of the variation characteristic of the reference signal by configuring the feedback resistor with the switched capacitor circuit and by changing the equivalent resistance of this switched capacitor circuit according to the frequency of the reference signal Vref.

The signal amplification unit 7, which uses a switched capacitor circuit, gives a high linearity if a capacitor having no voltage dependency is used for the capacitor. To implement a capacitor having such characteristics on a semiconductor chip, a general two-layer polysilicon process should be used to configure a capacitor whose electrodes are made of polysilicon. Note that, because the non-inverting amplifier circuit in FIG. 11B has the same configuration as that of the inverting amplifier circuit in FIG. 11A, the description is omitted here.

Figure 12A:
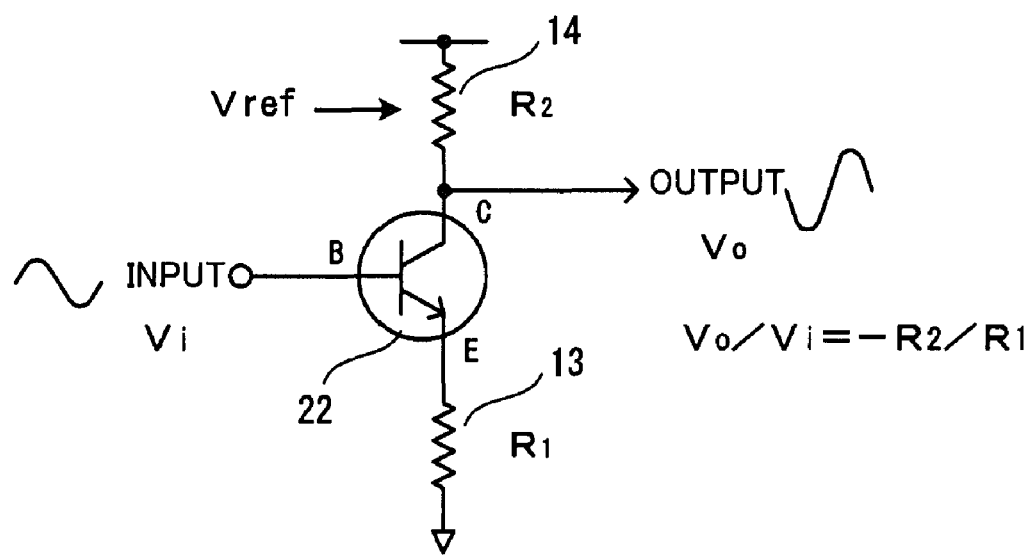
FIG. 12A and FIG. 12B are diagrams showing examples of the configuration of the present invention in which the output level variations in the sensor output are decreased when the signal level of the reference signal varies.
Figure 12B:
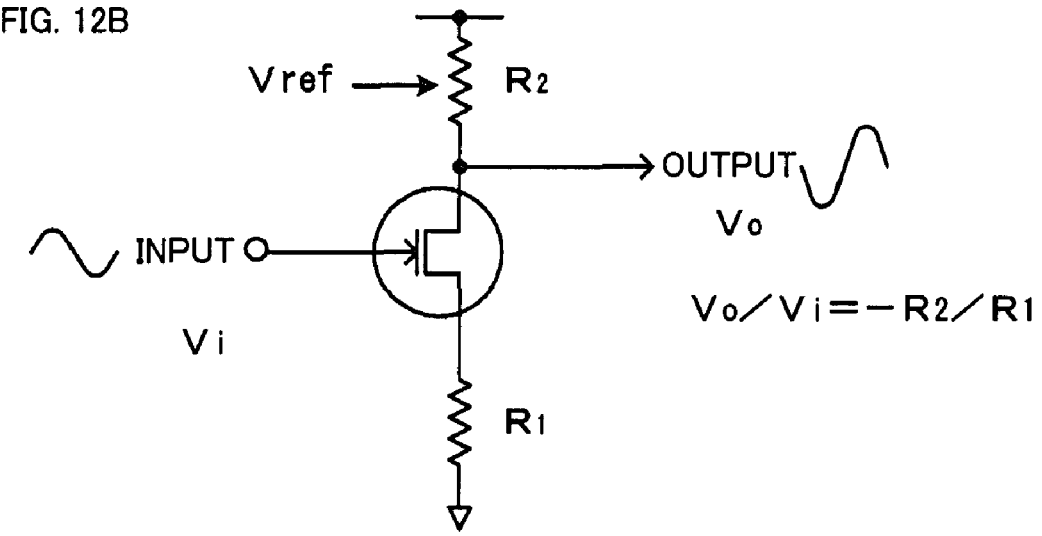

Although the signal amplification unit shown in FIG. 11 has the configuration in which the operational amplifier (OP Amp) is used, the active circuit that configures the amplifier circuit is not limited to the operational amplifier (OP Amp) but some other element may also be used. FIG. 12 is a diagram showing examples of the configuration in which a bipolar transistor or a FET is used as the active circuit. FIG. 12A shows an example of an emitter-grounded bipolar transistor. In the configuration shown in FIG. 12A, the gain is represented as (−R2/R1). In the configuration of the FET shown in FIG. 12B, the gain is represented also as (−R2/R1).

In this configuration, the resistor R2 is formed by a variable resistance circuit and the resistance value of this variable resistance circuit is adjusted by the frequency signal generated by frequency-converting the reference signal. This configuration makes the increase/decrease characteristic reversed between the reference signal and the gain of the amplifier circuit in the same way as in the example shown in FIG. 11, allowing the output level variations in the sensor output to be decreased when the signal level of the reference signal varies.

Figure 13A:
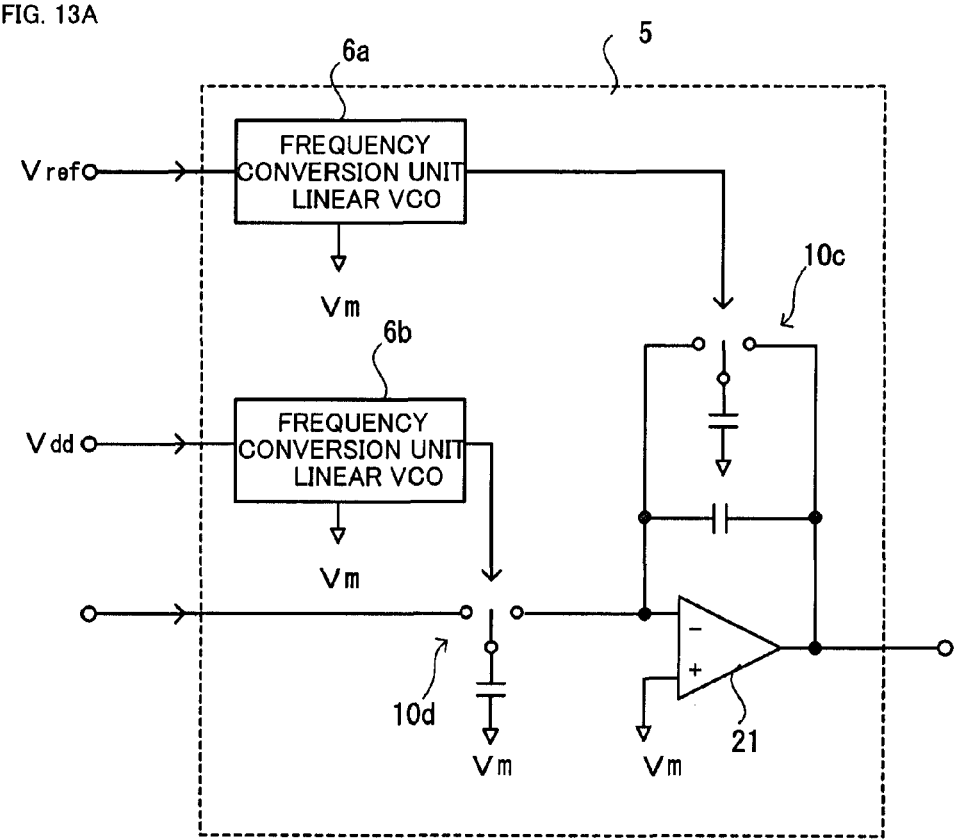
FIG. 13A and FIG. 13B are diagrams showing examples of the configuration of the physical quantity sensor in the first embodiment of the present invention in which the output level variations in the sensor output are decreased when the signal level of the reference signal varies or the power supply voltage varies.

FIG. 13A is a diagram showing the configuration formed by combining the configuration shown in FIG. 11A for stabilizing the output signal level against variations in the reference signal and the configuration for implementing the ratiometric characteristic. In this configuration example, a variable resistance circuit 10c is formed as the feedback resistor of the operational amplifier (OP Amp) 21, and a variable resistance circuit 10d is formed as the input resistor. The resistance value of the variable resistance circuit 10c is adjusted by the frequency signal generated by converting the voltage of the reference signal Vref via the frequency converter 6a. On the other hand, the resistance value of the variable resistance circuit 10d is adjusted by the frequency signal generated by converting the voltage of the power supply voltage Vdd via the frequency converter 6b.

The configuration for stabilizing the output signal level against the variations in the reference signal is configured by the variable resistance circuit 10c, and the output signal level against the variations in the reference signal is stabilized by the operation similar to that described in FIG. 11A. The variable resistance circuit 10d on the input resistor side can be configured by a switched capacitor circuit in the same way as in the variable resistance circuit 10c on the feedback resistor side.

The switch of the variable resistance circuit 10d is configured by a transfer gate (transmission gate) of an MOS element, and the contact state of the switch is configured in such a way that the contact state is switched according to the frequency signal from the frequency converter 6b. That is, the connection state of the capacitor is switched according to the frequency signal. The switch and the capacitor can be fabricated in the semiconductor process and configured on the same semiconductor chip.

One end of the capacitor of the variable resistance circuit 10d is connected to the midpoint voltage Vm, and the other end is connected to the fixed contact of the switch. One contact of the switch is the input terminal of the amplifier circuit for receiving the detected signal. The other contact of the switch is connected to the inverting input terminal of the operational amplifier (OP Amp) 21.

When the contact of the switch is connected to the detected signal side, the capacitor stores the voltage of the detected signal. Next, when the switch is connected to the side of the operational amplifier (OP Amp) 21, the charge stored in the capacitor is discharged to the filter capacitor via the operational amplifier (OP Amp) 21.

In this way, the connection state of the capacitor is switched by switching the switch of the variable resistance circuit 10d between the detected signal side and the side of the operational amplifier (OP Amp) 21 according to the frequency signal generated by the frequency converter 6b.

The high-speed switching operation of the switch described above causes the switched capacitor circuit 10d to perform the operation equivalent to a resistor element whose resistance value is represented by the inverse number of the product of the average switching frequency f of the switch and the capacity C of the capacitor. Because the frequency converter 6b outputs the frequency signal f according to the voltage of the power supply voltage Vdd, the resistance value of the variable resistance circuit 10d is inversely proportional to the power supply voltage Vdd. Because the gain of the operational amplifier (OP Amp) 21 is proportional to (feedback resistance/input resistance), the gain is eventually proportional to the power supply voltage Vdd.

Figure 13B:
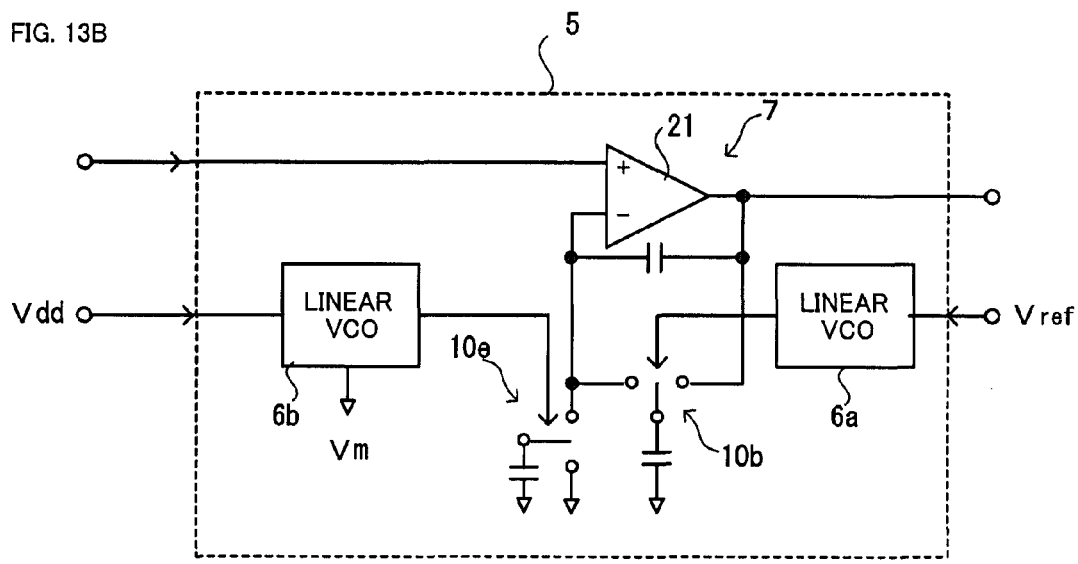

The non-inverting amplifier circuit in FIG. 13B can be configured by connecting a variable resistance circuit 10e, instead of the resistor in FIG. 11B, to the negative input of the non-inverting amplifier circuit. The variable resistance circuit 10e receives the frequency-converted output from the frequency converter 6b to change the resistance value in the reverse direction of the power supply voltage Vdd.

As in FIG. 11B, a variable resistance circuit 10b receives the frequency-converted output from the frequency converter 6a to change the resistance value according to the voltage Vref of the reference signal.

Figure 14:
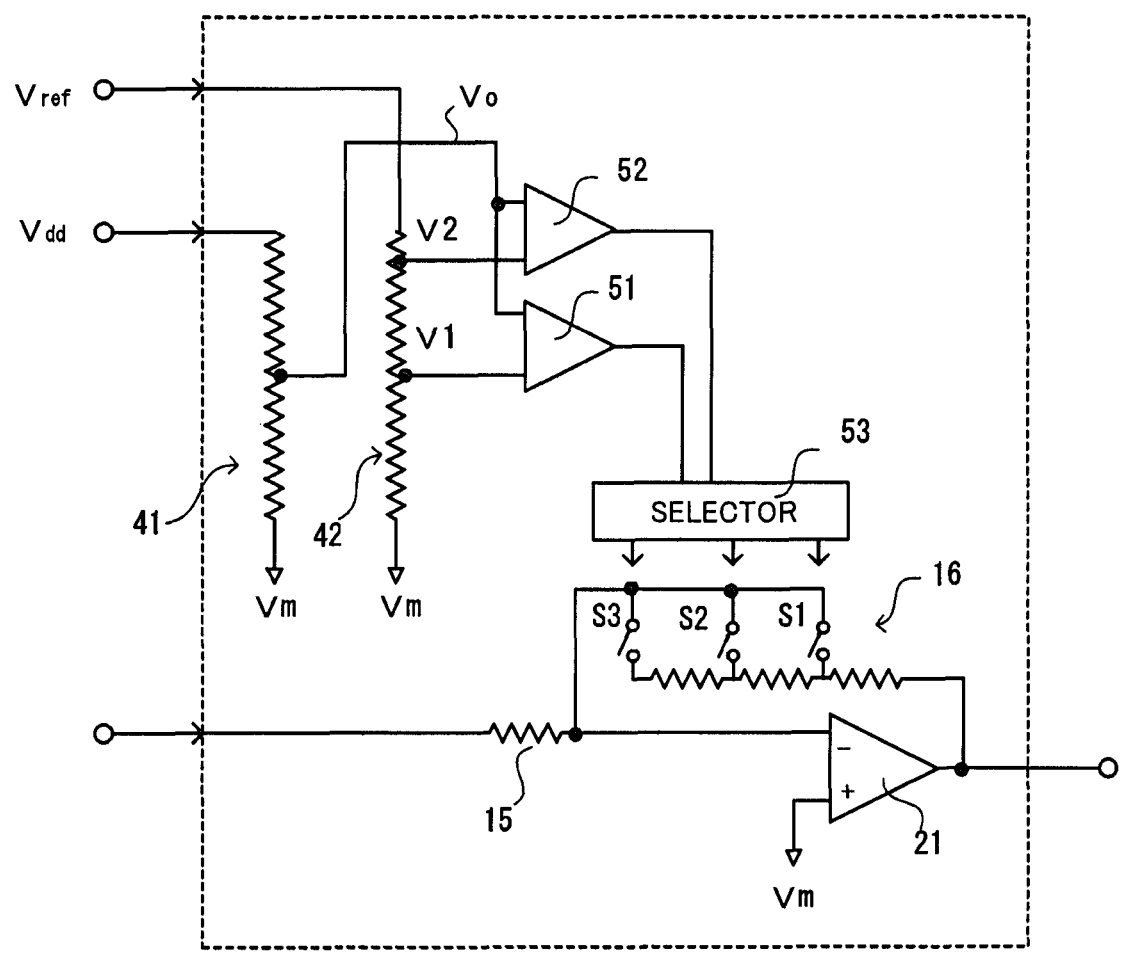
FIG. 14 is a diagram showing a physical quantity sensor in a second embodiment of the present invention in which the variable resistance circuit of the feedback resistor of the operational amplifier (OP Amp) is made variable by comparing the reference signal and the power supply voltage.

Next, with reference to FIGS. 14 and 15, the following describes a second embodiment in which the resistance value is selected and switched according to the voltage of the reference signal or the driving signal.

FIG. 14 is a diagram showing an example of the configuration in which the feedback resistor of the operational amplifier (OP Amp) is formed by a variable resistance circuit and the resistance value of this variable resistance circuit is made variable by selecting the selection signal generated by the comparison circuit by comparing the divided voltage of the reference signal Vref and the power supply voltage Vdd. In FIG. 14, the circuit is simplified for easy understanding.

In this simplified configuration, the voltage of the reference signal Vref is divided by a voltage dividing resistor 42 to form stepwise divided-voltages V1 and V2, and the divided voltages V1 and V2 are input to one of the input ends of comparison circuits 51 and 52, one for each, respectively. The divided voltage V0 of the power supply voltage Vdd is input to the other input terminal of the comparison circuits 51 and 52.

A feedback resistor 16 of an operational amplifier (OP Amp) 21 of the amplifier circuit is formed by a variable resistance circuit, and the resistance value of this variable resistance circuit is selected based on the comparison result of the comparison circuits 51 and 52 described above.

A selector 53 exclusively controls the connection of switches S1, S2, and S3 based on the comparison result of the comparison circuits 51 and 52. The switch S1 is selected if V0<V1<V2, the switch S2 is selected if V1<V0<V2, and the switch S3 is selected if V1<V2<V0.

When the switch S1 is on, the value of the feedback resistor 16 becomes low and the gain of the amplifier circuit becomes low. When the switch S2 is on, the value of the feedback resistor 16 becomes intermediate and the gain of the amplifier circuit becomes intermediate. When the switch S3 is on, the value of the feedback resistor 16 becomes high and the gain of the amplifier circuit becomes high.

Next, with reference to FIG. 15, the following describes the relation between the direction into which the reference signal is increased or decreased and the direction into which the gain selected by the switch is increased or decreased.

Figure 15A:
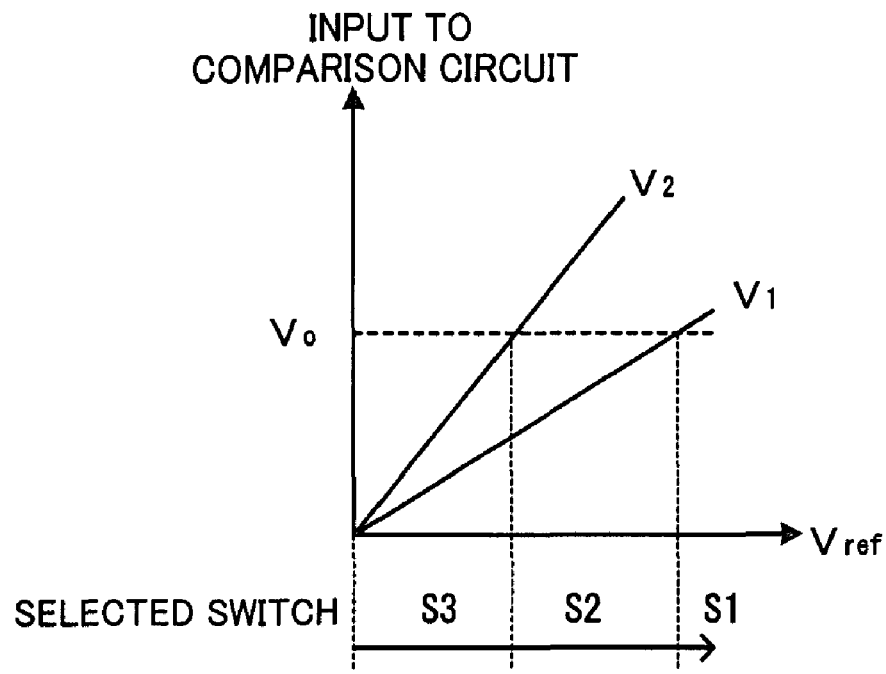
FIG. 15A and FIG. 15B diagrams showing the relation between the direction in which the reference signal increases or decreases and the direction in which the gain selected by the switch is increased or decreased.

FIG. 15A shows the relation between the reference signal Vref and the divided voltages V1-V2 generated by dividing the voltage of the reference signal Vref and the relation between the reference signal Vref and the power supply voltage Vdd used for comparison by the comparison circuit. Especially, the figure shows the states of V1 and V2 when the reference signal Vref varies. The voltage used for comparison by the comparison circuit is the divided voltage V0 generated by dividing the power supply voltage Vdd.

The comparison circuits 51 and 52 compare the divided voltages V1 and V2 with the power supply voltage Vdd that is used as the threshold. For example, when the reference signal Vref varies and its level becomes low, the operation is performed as follows. When the reference signal Vref varies and its level becomes low, its divided voltages V1 and V2 (V1<V2) also become low. In the range in which the higher divided voltage V2 is lower than V0 (V2<V0), the selector 53 selects the switch S3 and selects a high value for the feedback resistance. As a result, the gain of the amplifier circuit becomes high.

When the reference signal Vref varies and its level becomes higher than the low level, the operation is performed as follows. When the reference signal Vref varies and its level becomes intermediate and, in the range V1<V0<V2 in which the divided voltage V1 is lower than V0 and the divided voltage V2 is higher than V0, the selector 53 selects the switch S2 and selects an intermediate value for the feedback resistance. As a result, the gain of the amplifier circuit becomes intermediate.

When the reference signal Vref varies and its level becomes high, the operation is performed as follows. When the reference signal Vref varies and its level becomes high, the divided voltages V1 and V2 (V1<V2) also become high. In the range V0<V1 in which the lower divided voltage V1 is higher than V0, the selector 53 selects the switch S1 and selects a low value for the feedback resistance. As a result, the gain of the amplifier circuit becomes low.

So, the increase/decrease in the variations of the reference signal and the increase/decrease in the gain are in the reverse direction.

Figure 15B:
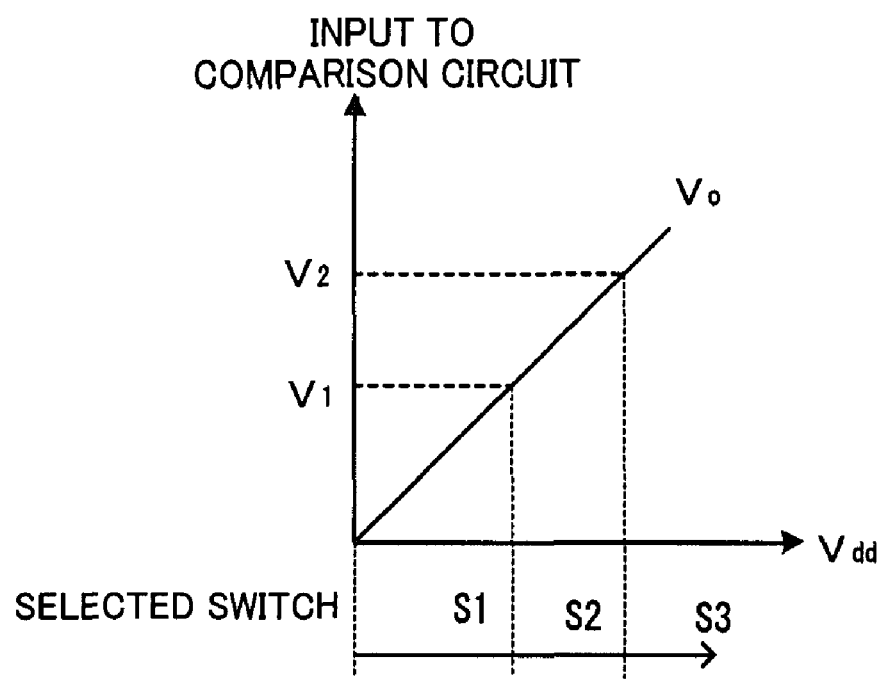

Next, with reference to FIG. 15B, the following describes the relation between the direction in which the power supply voltage is increased or decreased and the direction in which the gain selected by the switch is increased or decreased.

FIG. 15B shows the relation between the reference signal Vref and the divided voltages V1-V2 generated by dividing the voltage of the reference signal Vref and the relation between the reference signal Vref and the power supply voltage Vdd used in comparison by the comparison circuit. Especially, the figure shows V0 when the power supply voltage Vdd varies.

The comparison circuits 51 and 52 compare the divided voltages V1 and V2 with the power supply voltage Vdd that is used as the threshold. When the power supply voltage Vdd is low and V0 is lower than V1 (V0<V1), the selector 53 selects the switch S1 and the gain of the amplifier circuit becomes low. When the power supply voltage Vdd is intermediate and the V0 is higher than V1 but is lower than V2 (V1<V0<V2), the selector 53 selects the switch S2 and the gain of the amplifier circuit becomes intermediate. When the power supply voltage Vdd is higher than V2 (V2<V0), the selector 53 selects the switch S3 and the gain of the amplifier circuit becomes high.

So, the increase/decrease in the variations of the power supply voltage and the increase/decrease in the gain are in the same direction.

The ratio of the change in the gain of the amplifier circuit to the change in the power supply voltage and the reference signal according to the present invention can be determined arbitrarily by the division ratio of the voltage-dividing resistors and the variation steps of the variable resistor. This allows the configuration to be built so that the gain is changed in proportion to the power supply voltage Vdd and the gain is changed in inverse proportion to the reference signal Vref.

It is also possible to change the gain of the amplifier circuit almost linearly by increasing the number of variation steps of the comparison circuit and the variable resistance circuit for higher resolution. That is, the configuration of the present invention allows the output sensitivity of the physical quantity sensor to be kept constant against the variations in the reference signal and, at the same time, allows the physical quantity sensor to have the characteristic ratiometric to a change in the power supply voltage.

Next, with reference to FIG. 16, a third embodiment will be described in which the voltage of the reference signal or the driving signal is converted to the current for use in changing the resistance value.

Figure 16:
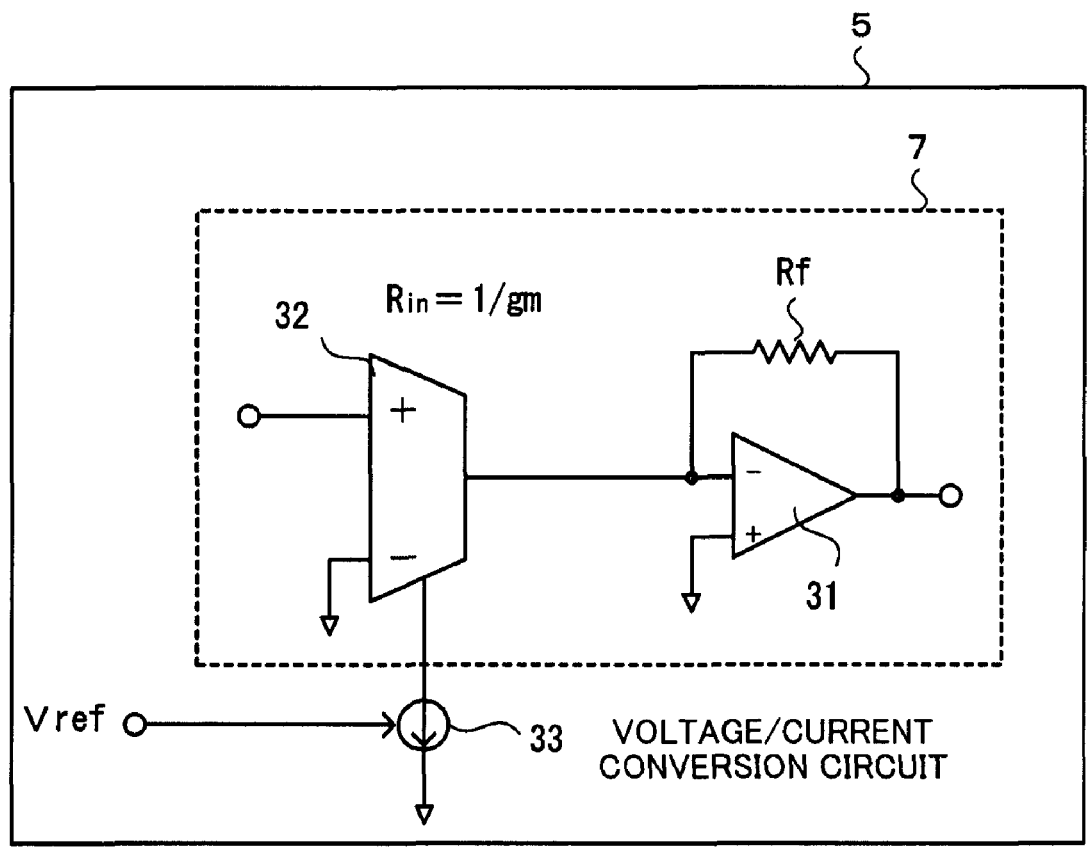
FIG. 16 is a diagram showing a physical quantity sensor in a third embodiment of the present invention that changes the resistance value by converting the voltage of the reference signal or the driving signal to a current.
Figure 17:
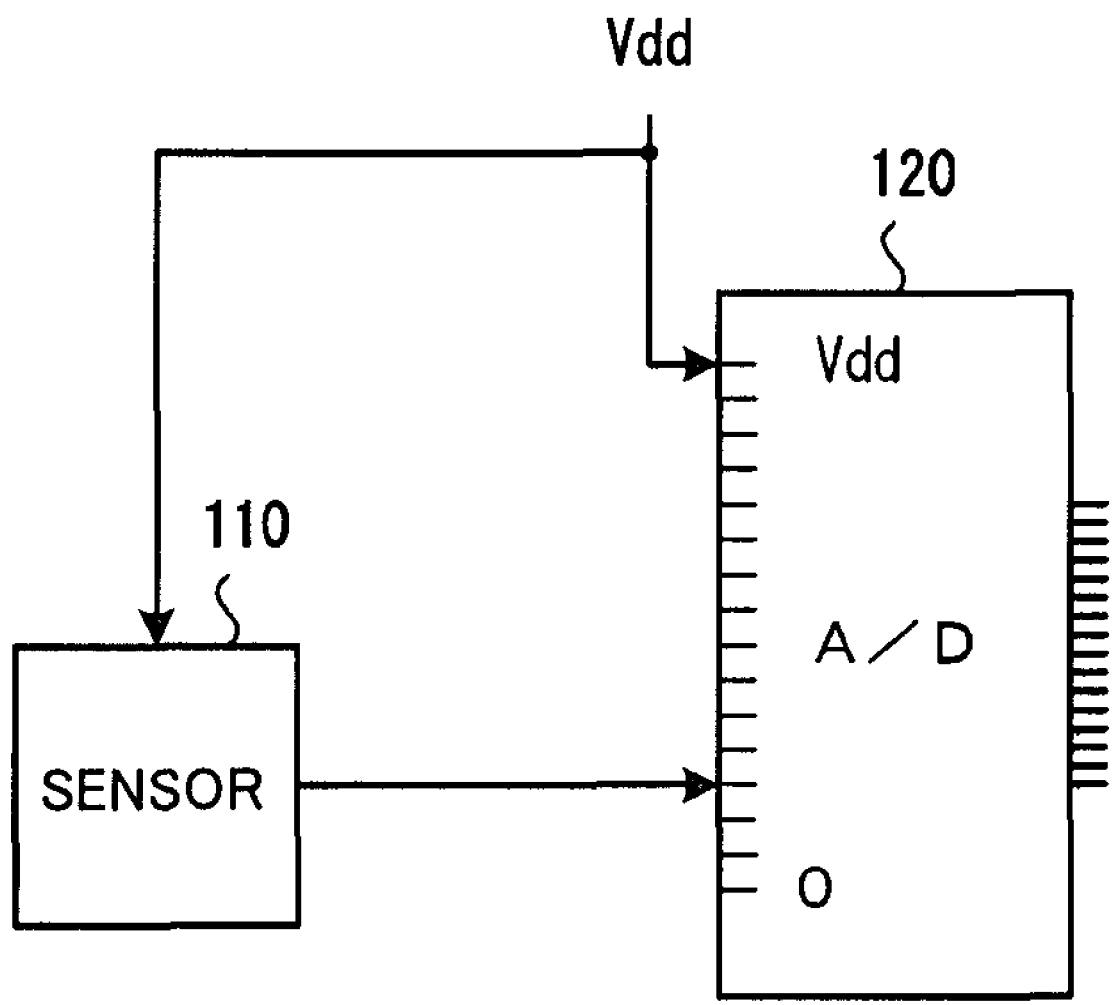
FIG. 17 is diagram showing the general configuration of a ratiometric structure.
Figure 18:
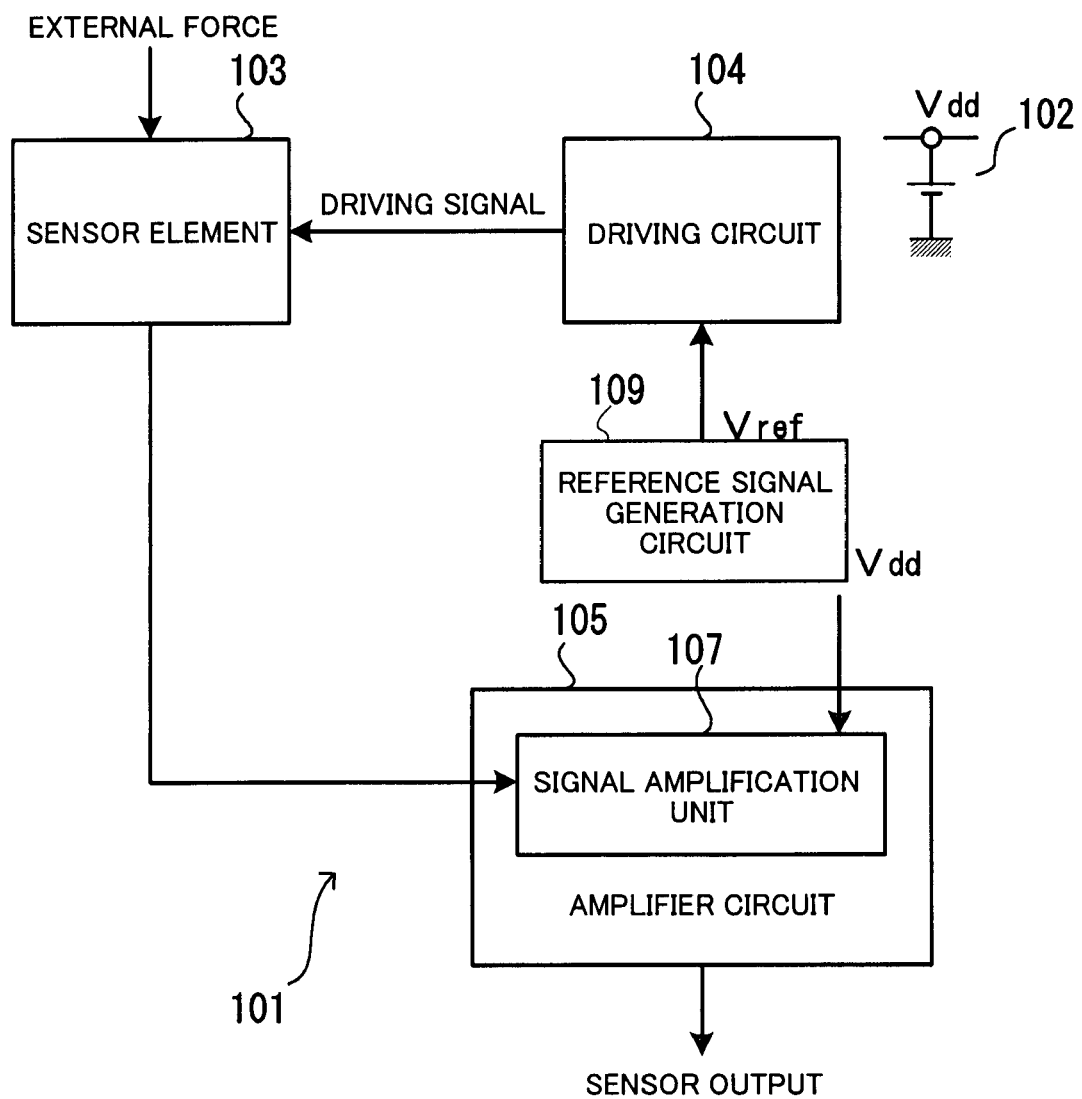
FIG. 18 is a diagram showing an example of the configuration of a physical quantity sensor.

FIG. 16 is a diagram showing an example of the configuration of an amplifier circuit 5 that uses a voltage-current conversion circuit (OTA: operational transconductance amplifier).

An OTA 32 constitutes the input resistor of an operational amplifier 31. The OTA 32 functions as a variable resistance circuit whose transconductance (gm) is changed according to the current signal from a voltage/current conversion circuit 33 that receives the reference signal Vref. The resistance value Rin of the variable resistance circuit is the inverse number of the transconductance (gm) and, by changing the transconductance (gm) via the reference signal Vref, the resistance ratio between the input resistance Rin and the feedback resistance Rf is changed for changing the gain.

The physical quantity sensor of the present invention is applicable to a vibration-type gyro sensor and a vibration-type acceleration sensor.

What is claimed is:

1. A physical quantity sensor comprising:
    a driving circuit that drives a sensor element based on a reference signal;
    said sensor element that is driven by said driving circuit to convert an externally applied physical quantity to an electrical signal; and
    an amplifier circuit that amplifies an output signal of said sensor element wherein
    said driving circuit controls a driving signal, which drives said sensor element, based on the reference signal so that the driving signal is at a constant level, and
    said amplifier circuit has a gain characteristic that amplifies an output signal in a direction reverse to a direction in which the reference signal varies or the driving signal of said driving circuit varies.

2. The physical quantity sensor according to claim 1 wherein
    said amplifier circuit has the gain characteristic that increases or decreases the output signal in the reverse direction of an increase/decrease direction of the reference signal or an increase/decrease direction of the driving signal of said driving circuit determined by variations in the reference signal, whereby
    an output level of the output signal of said amplifier circuit is kept constant regardless of variations in the reference signal.

3. The physical quantity sensor according to claim 1 or 2 wherein said amplifier circuit comprises an active circuit and a resistance circuit having a plurality of resistor elements wherein a gain is determined by a resistance ratio between the resistor elements and said resistance circuit has a variable resistance circuit in at least a part of said resistor elements, said variable resistance circuit making a resistance value variable according to variations in the reference signal or variations in the driving signal of said driving circuit.

4. The physical quantity sensor according to claim 1 or 2 wherein said amplifier circuit comprises an inverting amplifier circuit or a non-inverting amplifier circuit that has an operational amplifier and an input resistance circuit and a feedback resistance circuit connected to said operational amplifier wherein a gain is determined by a resistance ratio between said input resistance circuit and said feedback resistance circuit and a variable resistance circuit is formed in a resistor element of at least one of said input resistance circuit and said feedback resistance circuit, said variable resistance circuit making a resistance value variable according to variations in the reference signal or variations in the driving signal of said driving circuit.

5. The physical quantity sensor according to claim 3, further comprising a first frequency converter that converts a level of the reference signal or the driving signal of said driving circuit to a frequency wherein said variable resistance circuit changes the resistance value by a pulse modulated signal with a frequency obtained through the conversion by said first frequency converter.

6. The physical quantity sensor according to claim 5, further comprising a second frequency converter that converts a power supply voltage to a frequency wherein said variable resistance circuit changes the resistance value by a pulse modulated signal with a frequency, obtained through the conversion by said second frequency converter, for making the gain of said amplifier circuit proportional to an increase/decrease in the power supply voltage.

7. The physical quantity sensor according to claim 1 or 2 wherein said amplifier circuit is configured to determine a gain by a resistance ratio between a plurality of resistor elements connected to an active circuit, is configured to comprise a voltage-dividing circuit, which divides a voltage of the reference signal or the driving signal of said driving circuit into a predetermined steps, and comparison circuits and, at the same time, to determine the gain by a resistance ratio between a plurality of resistor elements, and has a variable resistance circuit formed in at least a part of said plurality of resistor elements for making a resistance value variable, each of said comparison circuits receives a divided voltage output of said voltage-dividing circuit at one of input ends and receives a voltage, determined by a power supply voltage, at another input end, and said variable resistance circuit changes the resistance value by an output signal of each comparison circuit to make the gain of said amplifier circuit inversely proportional to an increase/decrease in the reference signal or the driving signal of said driving circuit and, at the same time, to make the gain proportional to an increase/decrease in the power supply voltage.

8. The physical quantity sensor according to claim 7, further comprising:

a resistance selection circuit that selects the resistance value according to the output signal from said comparison circuits wherein said variable resistance circuit changes the resistance value to a resistance value selected by said resistance selection circuit.

9. The physical quantity sensor according to claim 3, further comprising a voltage to current converter that converts a voltage of the reference signal or a voltage of the driving signal of said driving circuit to a current wherein said variable resistance circuit changes the resistance value by the current obtained by the conversion through said voltage to current converter.

10. The physical quantity sensor according to claim 1 or 2, further comprising a power supply that supplies a power supply voltage to said amplifier circuit wherein said amplifier circuit makes the gain proportional to an increase/decrease in the power supply voltage.

11. The physical quantity sensor according to claim 1 or 2 wherein the output level of the output signal of said amplifier circuit is kept constant against reference signal variations generated by a change in a temperature.

* * * * *